(12) United States Patent
Yoshida et al.

(10) Patent No.: US 11,279,355 B2
(45) Date of Patent: Mar. 22, 2022

(54) TRAVELING CONTROL APPARATUS, VEHICLE, AND TRAVELING CONTROL METHOD

(71) Applicant: HONDA MOTOR CO., LTD., Tokyo (JP)

(72) Inventors: Yuma Yoshida, Wako (JP); Yuta Takada, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 142 days.

(21) Appl. No.: 16/744,820

(22) Filed: Jan. 16, 2020

(65) Prior Publication Data

US 2020/0148205 A1 May 14, 2020

Related U.S. Application Data

(63) Continuation of application No. PCT/JP2017/031217, filed on Aug. 30, 2017.

(51) Int. Cl.
*B60W 30/16* (2020.01)
*B60W 10/04* (2006.01)
(Continued)

(52) U.S. Cl.
CPC .......... *B60W 30/162* (2013.01); *B60W 10/04* (2013.01); *B60W 10/20* (2013.01);
(Continued)

(58) Field of Classification Search
CPC .... B60W 30/162; B60W 10/04; B60W 10/20; B60W 30/18; B60W 50/00;
(Continued)

(56) References Cited

U.S. PATENT DOCUMENTS

2005/0228588 A1* 10/2005 Braeuchle ............. B60W 30/12
701/301
2016/0221604 A1* 8/2016 Yamaoka ............. B62D 15/025
(Continued)

FOREIGN PATENT DOCUMENTS

JP 4005597 B2 11/2007
JP 2015-189404 A 11/2015
(Continued)

OTHER PUBLICATIONS

International Search Report dated Oct. 24, 2017, issued in counterpart International Application No. PCT/JP2017/031217 (2 pages).

*Primary Examiner* — Jonathan M Dager
*Assistant Examiner* — Jean W Charleston
(74) *Attorney, Agent, or Firm* — Westerman, Hattori, Daniels & Adrian, LLP

(57) ABSTRACT

A traveling control apparatus is configured to control automated driving traveling of a vehicle based on a set automated driving level. The traveling control apparatus comprises: an acquisition unit configured to acquire traveling scene information that specifies a traveling scene of the vehicle; and a control unit configured to perform offset control to offset a traveling position of the vehicle in a vehicle width direction to increase a distance to another vehicle traveling side by side with the vehicle. The control unit performs the offset control by setting one of a first mode and a second mode based on at least one of the traveling scene information and the automated driving level.

20 Claims, 13 Drawing Sheets

(51) Int. Cl.
*B60W 10/20* (2006.01)
*B60W 30/18* (2012.01)
*B60W 50/00* (2006.01)
*G05D 1/00* (2006.01)

(52) U.S. Cl.
CPC ............ *B60W 30/18* (2013.01); *B60W 50/00* (2013.01); *G05D 1/0088* (2013.01); *B60W 2552/05* (2020.02); *B60W 2554/20* (2020.02); *B60W 2554/4041* (2020.02); *B60W 2710/20* (2013.01); *B60W 2720/106* (2013.01); *B60W 2754/20* (2020.02)

(58) Field of Classification Search
CPC ..... B60W 2554/20; B60W 2554/4041; B60W 2754/20; B60W 2552/05; B60W 2710/20; B60W 2720/106; B60W 2552/53; B60W 2554/801; B60W 2554/802; B60W 60/00; B60W 30/12; G05D 1/0088
USPC .......................................................... 701/23
See application file for complete search history.

(56) References Cited

U.S. PATENT DOCUMENTS

| | | | |
|---|---|---|---|
| 2017/0197618 A1* | 7/2017 | Ali ......................... | B60W 30/16 |
| 2018/0215389 A1* | 8/2018 | Takae .................... | B60W 40/08 |
| 2018/0218601 A1* | 8/2018 | Aoki ...................... | B60W 40/04 |
| 2018/0362047 A1* | 12/2018 | Hagawa ................ | B60W 10/20 |
| 2019/0171204 A1* | 6/2019 | Jang ....................... | B60W 30/16 |
| 2019/0187710 A1* | 6/2019 | Funayama ............ | G05D 1/0221 |
| 2020/0027353 A1* | 1/2020 | Takahashi ............. | B60W 50/14 |

FOREIGN PATENT DOCUMENTS

| | | | |
|---|---|---|---|
| JP | 2016-139369 A | | 8/2016 |
| JP | 2016-151864 A | | 8/2016 |
| JP | 2016151864 A | * | 8/2016 |
| WO | 2016/024313 A1 | | 2/2016 |

* cited by examiner

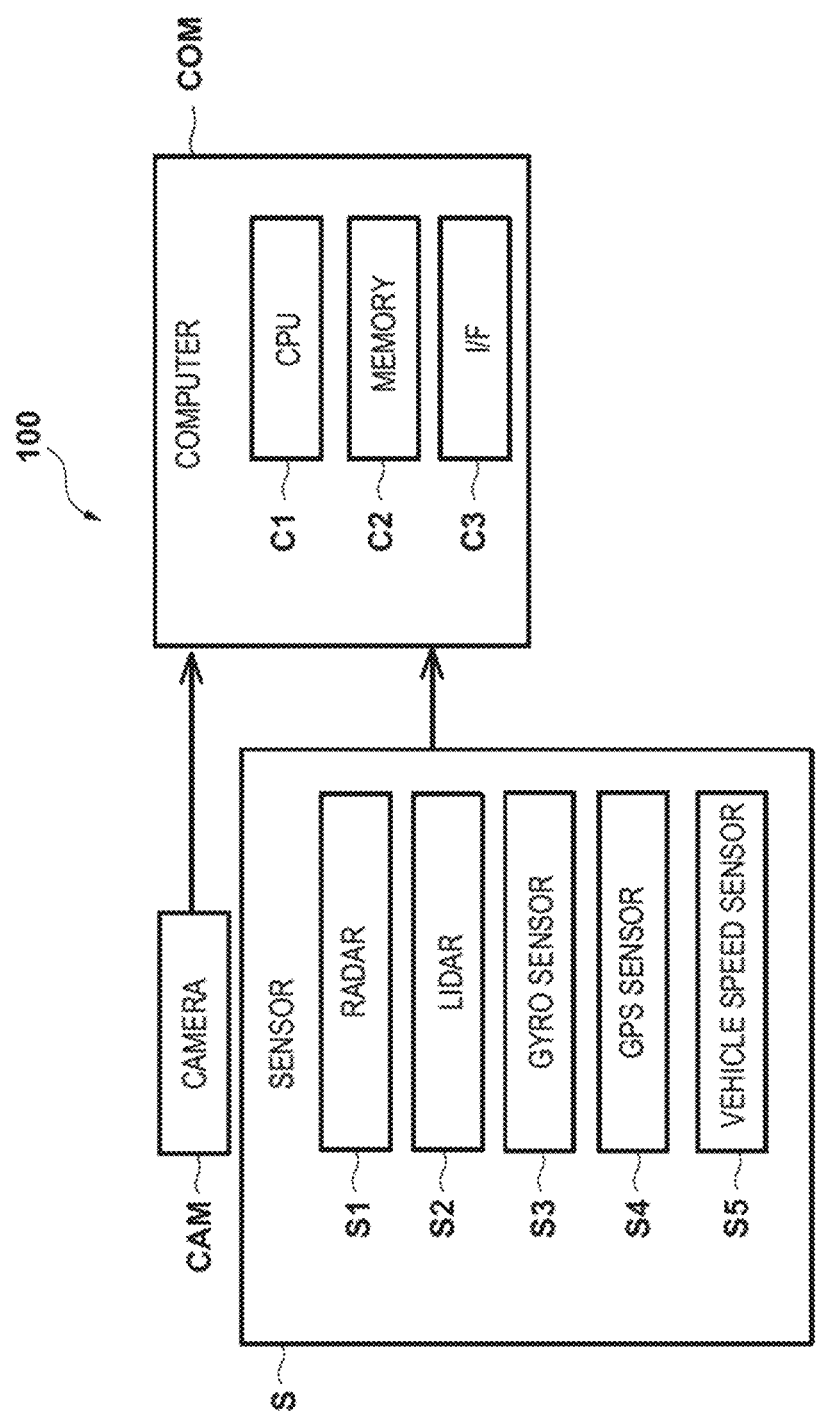

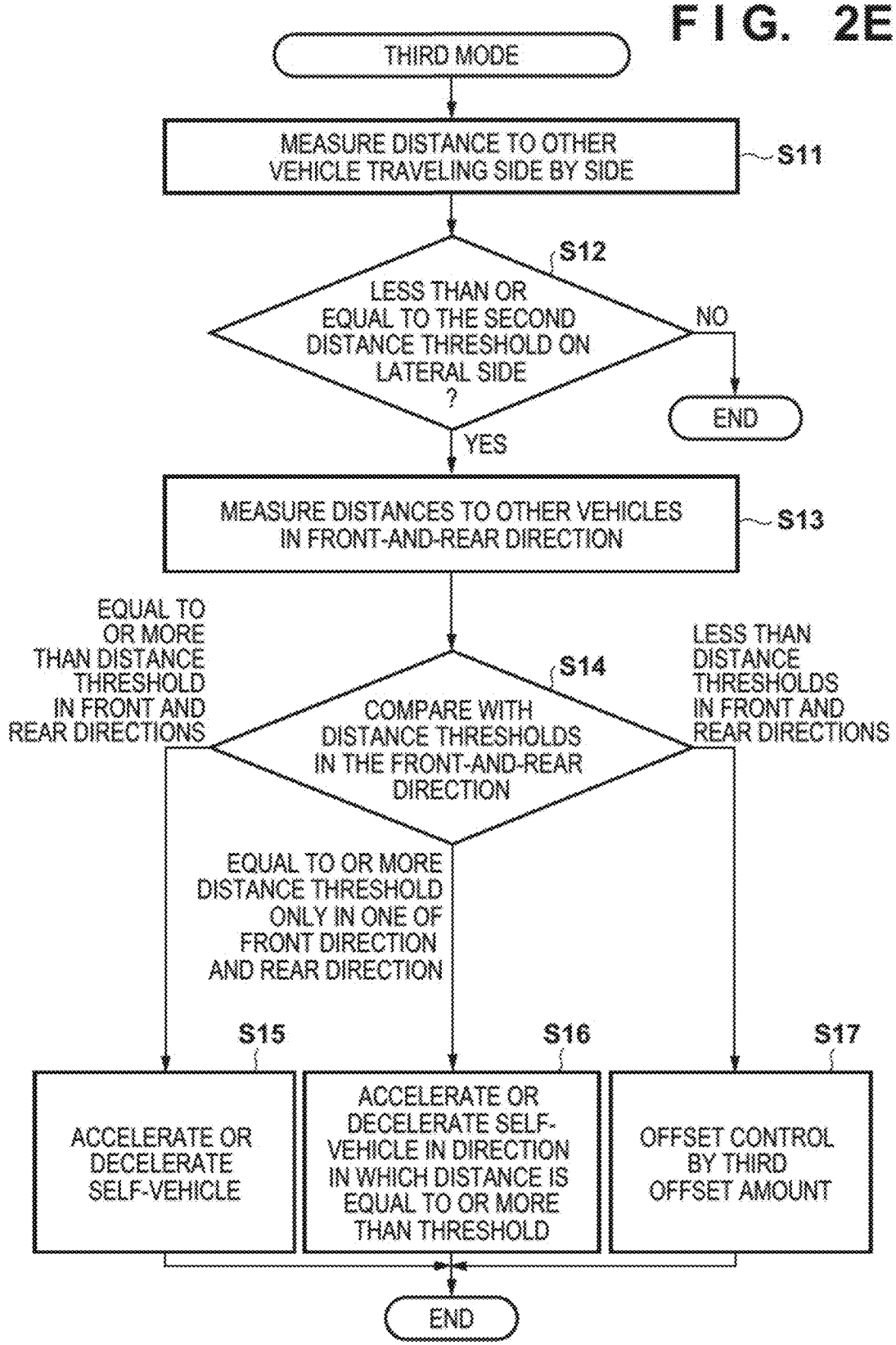

FIG. 3

| CONTROL MODE | FIRST MODE | SECOND MODE | THIRD MODE |
|---|---|---|---|
| OFFSET AMOUNT | LARGE; FIRST OFFSET AMOUNT | SMALL (SUPPRESSED) OR CANCELED; SECOND OFFSET AMOUNT | EMERGENCY AVOIDANCE; THIRD OFFSET AMOUNT |
| FOLLOWING IN CONGESTION | — | ◎ PREFERENTIALLY EXECUTE | ○ POSSIBLE |
| NON-AUTOMOBILE ROAD | — | ◎ PREFERENTIALLY EXECUTE | ○ POSSIBLE |
| AUTOMOBILE ROAD | ◎ PREFERENTIALLY EXECUTE | ○ POSSIBLE | △ BASICALLY SUPPORT IN FIRST MODE |
| HIGH AUTOMATED DRIVING LEVEL (NO SURROUNDINGS MONITORING DUTY) | — | ◎ PREFERENTIALLY EXECUTE | ○ POSSIBLE |
| LOW AUTOMATED DRIVING LEVEL (SURROUNDINGS MONITORING DUTY) | ◎ PREFERENTIALLY EXECUTE | — | △ BASICALLY SUPPORT IN FIRST MODE |
| AUTOMATED DRIVING LEVEL TRANSITION (HIGH → LOW) | ◎ PREFERENTIALLY EXECUTE | — | △ BASICALLY SUPPORT IN FIRST MODE |
| AUTOMATED DRIVING LEVEL TRANSITION (LOW → HIGH) | — | ◎ PREFERENTIALLY EXECUTE | ○ POSSIBLE |
| TRANSITION FROM MANUAL DRIVING TO AUTOMATED DRIVING | — | ◎ PREFERENTIALLY EXECUTE | ○ POSSIBLE |
| TRANSITION FROM AUTOMATED DRIVING TO MANUAL DRIVING | — | — | — |

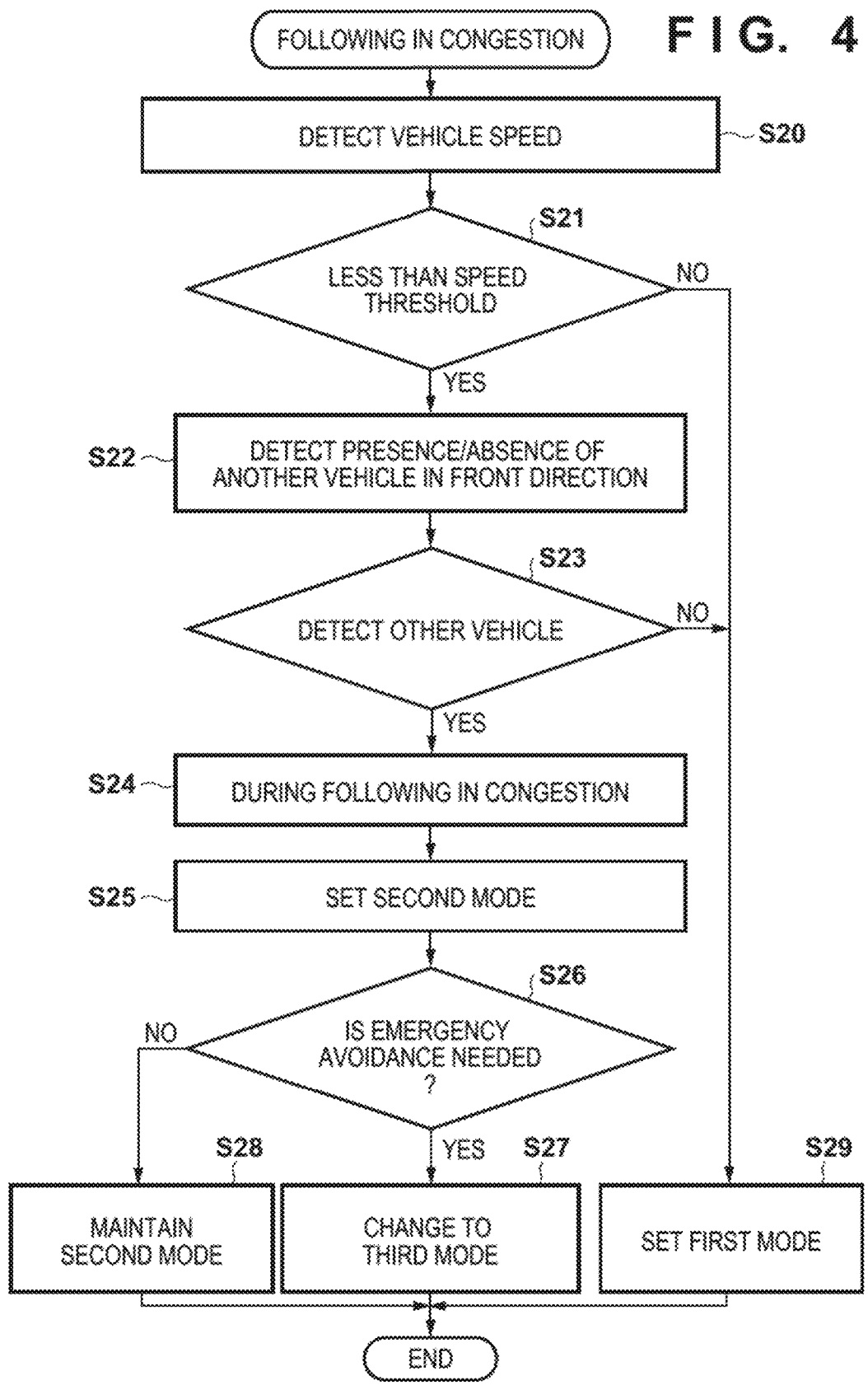

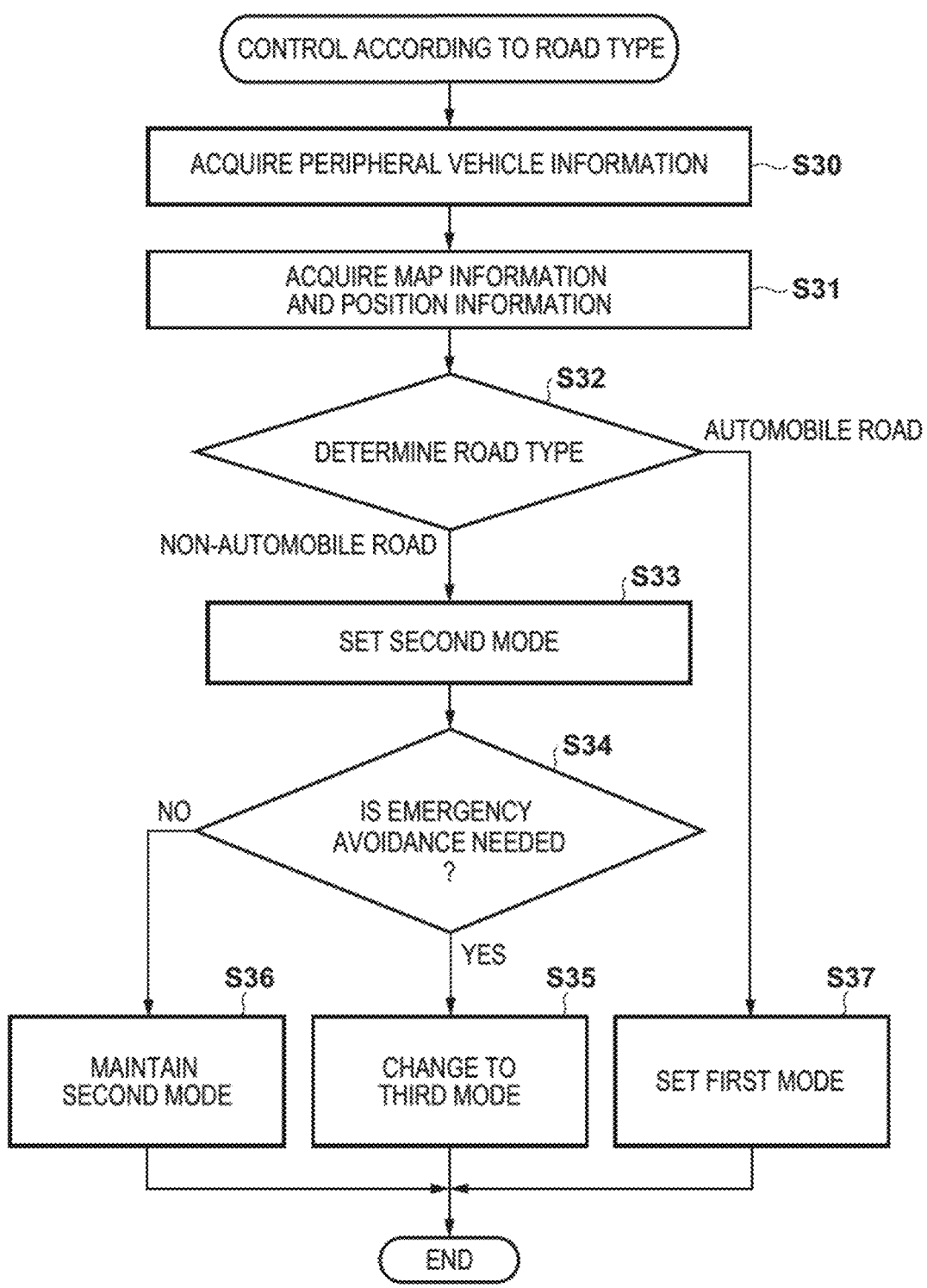

TRAVELING CONTROL APPARATUS, VEHICLE, AND TRAVELING CONTROL METHOD

CROSS-REFERENCE TO RELATED APPLICATION(S)

This application is a continuation of International Patent Application No. PCT/JP2017/031217 filed on Aug. 30, 2017, the entire disclosures of which is incorporated herein by reference.

BACKGROUND OF THE INVENTION

Field of the Invention

The present invention relates to a traveling control apparatus, a vehicle, and a traveling control method.

Description of the Related Art

PTL 1 discloses a technique of setting the target route of a self-vehicle with respect to another vehicle based on the relative speed to the other vehicle of an avoidance target existing around the self-vehicle.

CITATION LIST

Patent Literature

PTL 1: WO 2016/024313

In the arrangement of PTL 1, however, since the target route is set based on the relative speed to the other vehicle, in some cases, it may be impossible to control an offset amount to the other vehicle in different traveling scenes of the vehicle of the control target, including traveling scenes in which the vehicle is following in congestion, traveling on a general road, and traveling on an expressway.

The present invention has been made in consideration of the above-described problem, and provides a traveling control technique capable of controlling an offset amount to another vehicle in accordance with the traveling scene of a vehicle.

SUMMARY OF THE INVENTION

According to an aspect of the present invention, there is provided a traveling control apparatus configured to control automated driving, traveling of a vehicle based on a set automated driving level, comprising: an acquisition unit configured to acquire traveling scene information that specifies a traveling scene of the vehicle; and a control unit configured to perform offset control to offset a traveling position of the vehicle in a vehicle width direction to increase a distance to another vehicle traveling side by side with the vehicle, wherein the control unit has, as modes of the offset control, a first mode in which if the distance to the other vehicle becomes not more than a first distance threshold on a lateral side, the distance is increased by a first offset amount, and a second mode of a second offset amount whose offset amount is suppressed as compared to the first offset amount in the first mode, and performs the offset control by setting one of the first mode and the second mode based on at least one of the traveling scene information and the automated driving level.

According to the present invention, it is possible to control an offset amount to another vehicle in accordance with the traveling scene of a vehicle.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a view exemplarily showing the basic arrangement of a traveling control apparatus that performs automated driving control of a vehicle;

FIG. 2E is a flowchart for explaining the procedure of processing of the third mode in the case shown in FIG. 2D;

FIG. 3 is a view exemplarily showing the contents of offset control according to traveling scenes;

FIG. 4 is a flowchart for explaining the procedure of offset control in traffic congestion follow;

FIG. 5 is a flowchart for explaining the procedure of offset control according to a road type;

DESCRIPTION OF THE EMBODIMENTS

Figure 1B:
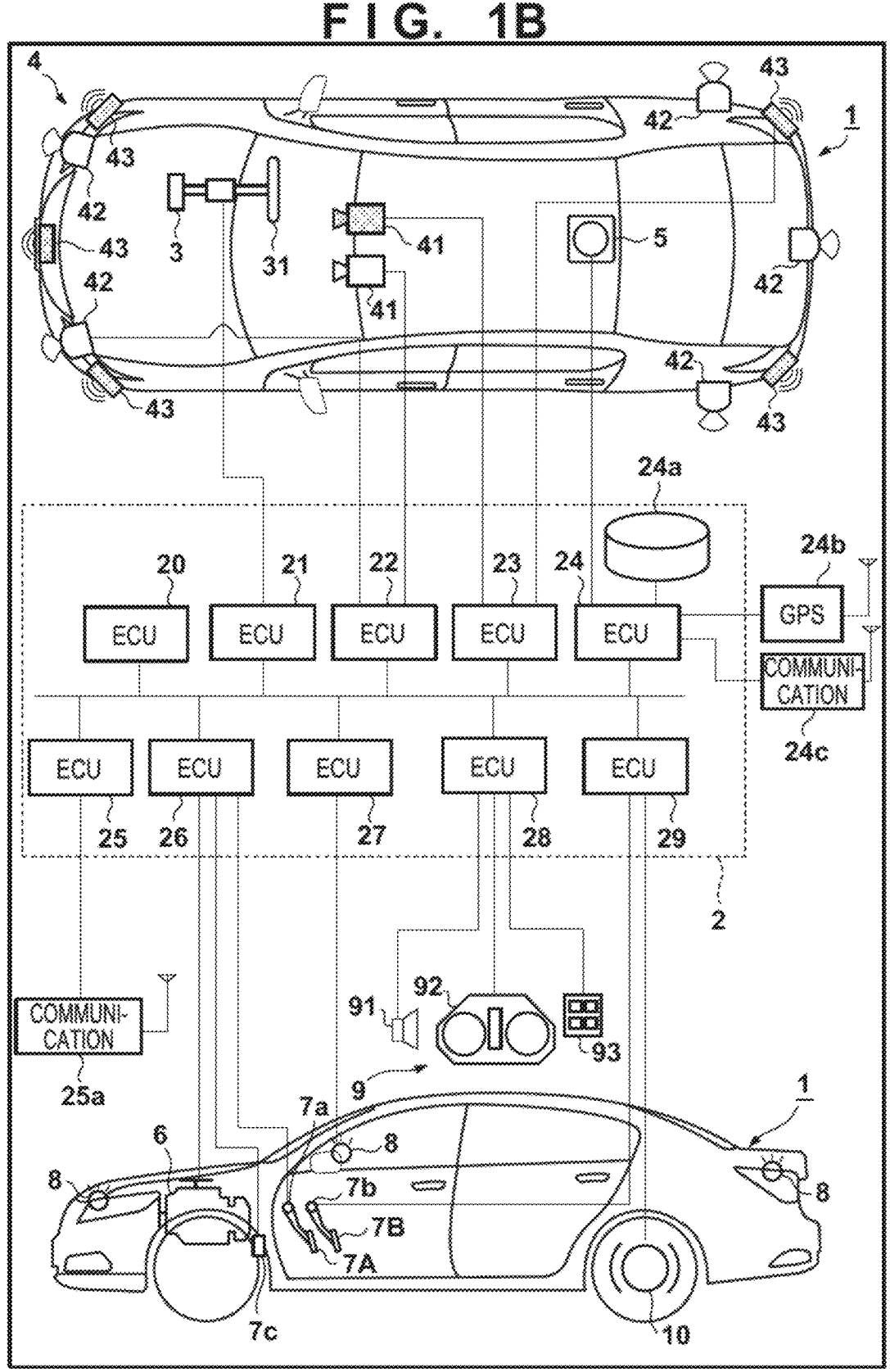
FIG. 1B is a view showing an example of the arrangement of a control block diagram of the traveling control apparatus.

An embodiment of the present invention will now be described with reference to the accompanying drawings. The constituent elements described in the embodiment are merely examples and are not limited by the following embodiment.

(Arrangement of Traveling Control Apparatus)

FIG. 1A is a view exemplarily showing the basic arrangement of a traveling control apparatus 100 that performs automated driving control of a vehicle. The traveling control apparatus 100 includes a sensor S, a camera CAM, and a computer COM. The sensor S includes, for example, a radar S1, a lidar S2, a gyro sensor S3, a GPS sensor S4, a vehicle speed sensor S5, and the like. In addition, the computer COM includes a CPU (C1) that controls processing concerning automated driving control of the vehicle, a memory C2, an interface (I/F) C3 to an external device, and the like. The sensor S and the camera CAM acquire various kinds of information of the vehicle, and input them to the computer COM. Here, the vehicle including the computer COM will also be referred to as a self-vehicle, and a two- or four-wheeled vehicle existing around the self-vehicle will also be referred to as another vehicle in the following explanation.

The computer COM performs image processing for the information input from the sensor S (the radar S1 and the lidar S2) and the camera CAM, and extracts a target (object) existing around the self-vehicle as peripheral vehicle information. Targets include, for example, static targets (for example, stationary objects such as road structures including a lane, a road width, a traffic signal, a curbstone, a sign, and a guardrail) that do not move along with the elapse of time, and dynamic objects (for example, moving objects such as another vehicle and a pedestrian) that move along with the elapse of time.

The computer COM extracts a target, as peripheral vehicle information, from images acquired by the sensor S (the radar S1 and the lidar S2) and the camera CAM, and analyzes what kind of target is arranged around the self-vehicle. For example, it is possible to acquire the information of other vehicles traveling on the front and rear sides of the self-vehicle on the same lane as the lane in which the self-vehicle is traveling and the information of other vehicles traveling side by side with the self-vehicle on a lane adjacent the lane in which the self-vehicle is traveling.

The gyro sensor S3 detects the rotary motion and orientation of the self-vehicle. The computer COM can determine the course of the self-vehicle based on the detection result of the gyro sensor S3, a vehicle speed detected by the vehicle speed sensor S5, and the like. The GPS sensor S4 detects the current position (position information) of the self-vehicle in map information. The interface (I/F) C3 functions as a communication device, performs wireless communication with a server that provides map information or traffic information, and acquires these pieces of information. The computer COM can store the acquired information in the memory C2 functioning as a storage device, access a database of map information or traffic information formed in the memory C2, and search for a route from the current position to the destination.

When the traveling control apparatus 100 shown in FIG. 1A is mounted in the vehicle, the computer COM may be arranged in, for example, an ECU of a recognition processing system configured to process information of the sensor S or the camera CAM or an ECU of an image processing system, or may be arranged in an ECU of a control unit configured to perform driving control of the vehicle or an ECU for automated driving. For example, as shown in FIG. 1B to be described below, the functions may be distributed to a plurality of ECUs such as an ECU for the sensor S, an ECU for the camera, and an ECU for automated driving, which constitute the traveling control apparatus 100.

FIG. 1B is a view showing an example of the arrangement of a control block diagram of the traveling control apparatus 100 configured to control a vehicle 1. Referring to FIG. 1B, an outline of the vehicle 1 is shown in a plan view and a side view. As an example, the vehicle 1 is a sedan-type four-wheeled vehicle.

A control unit 2 shown in FIG. 1B controls each unit of the vehicle 1. The control unit 2 includes a plurality of ECUs 20 to 29 communicably connected by an in-vehicle network. Each ECU (Electronic Control Unit) includes a processor represented by a CPU (Central Processing Unit), a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed in the vehicle 1, and they can be subdivided or integrated as compared to this embodiment.

The ECU 20 executes traveling control associated with automated driving of the vehicle 1 (self-vehicle) according to this embodiment. In automated driving, at least one of steering and acceleration/deceleration of the vehicle 1 is automatically controlled. Processing concerning detailed control concerning automated driving will be described later in detail.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the advancing direction of the vehicle 1.

The ECUs 22 and 23 perform control of detection units 41 to 43 that detect the peripheral status of the vehicle and information processing of detection results. The detection unit 41 is, for example, a camera (to be sometimes referred to as the camera 41 hereinafter) that captures the front side of the vehicle 1. In this embodiment, two cameras 41 are provided at the roof front of the vehicle 1. When images captured by the cameras 41 are analyzed (image processing), the contour of a target or a division line (a white line or the like) of a lane on a road can be extracted.

The detection unit 42 (lidar detection unit) is, for example, a light detection and ranging (LIDAR) (to be sometimes referred to as the lidars 42 hereinafter), and detects a target around the vehicle 1 or measures the distance to a target by light. In this embodiment, a plurality of lidars 42 are provided around the vehicle. In the example shown in FIG. 1B, for example, five lidars 42 are provided; one at each corner of the front portion of the vehicle 1, one at the center of the rear portion, and one on each side of the rear portion. The detection unit 43 (radar detection unit) is, for example, a millimeter wave radar (to be sometimes referred to as the radar 43 hereinafter), and detects a target around the vehicle 1 or measures the distance to a target by a radio wave. In this embodiment, a plurality of radars 43 are provided around the vehicle 1. In the example shown in FIG. 1B, for example, five radars 43 are provided; one at the center of the front portion of the vehicle 1, one at each corner of the front portion, and one at each corner of the rear portion.

The ECU 22 performs control of one camera 41 and each lidar 42 and information processing of detection results. The ECU 23 performs control of the other camera 41 and each radar 43 and information processing of detection results. Since two sets of devices that detect the peripheral status of the vehicle are provided, the reliability of detection results can be improved. In addition, since detection units of different types such as cameras, lidars, and radars are provided, the peripheral environment of the vehicle can be analyzed multilaterally. Note that the ECU 22 and the ECU 23 may be integrated into one ECU.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination. The database 24a can be arranged on a network, and the communication device 24c can access the database 24a on the network and acquire information.

The ECU 25 includes a communication device 25a for inter-vehicle communication. The communication device 25a performs wireless communication with another vehicle on the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 1B, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by a voice. A display device 92 notifies the driver of information by displaying an image. The display device 92 is arranged, for example, on the surface of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation and used to issue an instruction to the vehicle 1, and may also include a voice input device.

The ECU 29 controls a brake device 10 and a parking betake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

In traveling control according to this embodiment, the ECU 22 shown in FIG. 1B performs information processing for the detection results of one camera 41 and the lidars 42, and the ECU 23 performs information processing for the detection results of the other camera 41 and the radars 43. Based on the result of information processing of the ECU 22 and the ECU 23, the ECU 20 can acquire the information of a target (for example, another vehicle or the like) located around the vehicle 1 (self-vehicle) as peripheral vehicle information. For example, it is possible to acquire, for example, information concerning the positions, relative distances (intervals), speeds, and the like of other vehicles traveling on the front and rear sides of the self-vehicle and other vehicles traveling side by side with the self-vehicle on a lane adjacent the lane in which the self-vehicle is traveling.

In addition, the ECU 24 performs information processing of the detection result or communication result of the pro sensor 5, the GPS sensor 24b, and the communication device 24c, and the ECU 26 performs processing of vehicle speed illumination detected by the vehicle speed sensor 7c.

Based on the result of information processing of the ECU 24 and the ECU 26, the ECU 20 can acquire map information, determine the course of the self-vehicle, and detect the vehicle speed of the self-vehicle and the current position (position information) of the vehicle 1 on the map information.

Traveling scene information that specifies the traveling scene of the vehicle includes at least one of the above-described map information, current position (position information) of the vehicle 1 on the map information, and peripheral vehicle information concerning a target located around the vehicle 1 (self-vehicle).

In traveling control (automated driving) of the thus configured vehicle 1 (self-vehicle), if, in the relative positional relationship with another vehicle traveling side by side, the other vehicle approaches the vehicle 1 (self-vehicle) to a distance equal to or less than a first distance threshold on a predetermined lateral side, the ECU 20 controls the interval (offset amount) on the lateral side to the other vehicle traveling side by side. That is, the ECU 20 performs offset control to offset the traveling position of the vehicle 1 in the vehicle width direction to increase the distance to the other vehicle traveling side by side with the vehicle 1.

<Outline of Offset Control>

(First Mode and Second Mode)

In this embodiment, the ECU 20 can control the automated driving traveling of the vehicle 1 based on set automated driving level. A detailed description of the automated driving level will be made later. As the modes of the offset control, the ECU 20 has a first mode in which if the distance to the other vehicle traveling side by side with the vehicle 1 becomes equal to or less than a first distance threshold LTH1 on the lateral side, the distance is increased by the first offset amount, and a second mode of a second offset amount whose offset amount is suppressed as compared to the first offset amount in the first mode.

Here, the ECU 20 can determine the type of the other vehicle traveling side by side based on peripheral vehicle information. The ECU 20 can perform offset control by setting the first offset amount of the first mode and the second offset amount of the second mode in accordance with the type of the other vehicle determined based on the peripheral vehicle information. The ECU 20 can determine the type of the other vehicle traveling side by side as, for example, a two-wheeled vehicle such as a motorcycle, a small four-wheeled vehicle such as a light vehicle, a large four-wheeled vehicle such as a truck, or the like based on the peripheral vehicle information and perform offset control by setting the first offset amount and the second offset amount in accordance with the determination result.

For example, the offset amount for a two-wheeled vehicle may be set larger than the offset amount for a large four-wheeled vehicle, and a setting reverse to that may be done. In a case in which the offset amount for a two-wheeled vehicle or the like is set large, it is possible to do automated driving more in consideration of safety for vulnerable road users. Additionally, in a case in which the offset amount for a large four-wheeled vehicle is set large, automated driving that gives more sense of security to a driver and the like can be performed by setting a relatively large offset amount so as not to approach the large four wheeled vehicle too much.

In addition to performing offset control by setting different offset amounts in the first mode and the second mode, the ECU 20 can also perform offset control by setting different offset counts (frequencies) in the first mode and the second mode. For example, the ECU 20 can set a first offset count (frequency) in the first mode and the second mode of a second offset count (frequency) that is suppressed as compared to the first mode, and perform offset control. Here, in the second mode, suppressing the other count (frequency) includes an (offset inhibition) mode in which offset is not performed.

The ECU 20 can perform control such that if the distance to the other vehicle traveling side by side becomes equal to or less than the first distance threshold LTH1, the first accumulated offset count (frequency) is incremented, if the incremented first accumulated offset count (frequency) is equal to or less than the offset count set in each of the first mode and the second mode offset control is performed, and if the first accumulated offset count exceeds the set offset counts, execution of offset control is suppressed.

That is, concerning offset control in the first mode, the ECU 20 performs control such that if the first accumulated offset count (frequency) is equal to or less than a first offset threshold count (frequency) set in the first mode, offset control is performed, and if the first accumulated offset count exceeds the first offset threshold count (frequency), execution of offset control is suppressed.

In addition, concerning offset control in the second mode, the ECU 20 performs control such that if the first accumulated offset count (frequency) is equal to or less than a second offset threshold count (frequency) set in the second mode, offset control is performed, and if the first accumulated offset count exceeds the second offset threshold count (frequency), execution of offset control is suppressed.

For example, in processing at the time of following in congestion as an example of a traveling scene to be described later, not to give the driver and the like a sense of cumbersomeness caused by repetitively performing the offset operation every time the other vehicle approaches the self-vehicle, in the processing at the time of following in congestion, the ECU 20 may suppress the offset amount or offset count (frequency) based on the setting of the second mode. As described above, offset control according to the traveling scene of the vehicle can be performed by setting different offset amounts and offset counts (frequencies) in the first mode and the second mode.

In addition, the ECU 20 can also perform offset control by combining the offset counts (frequencies) set in the first mode and the second mode and an offset amount set in accordance with the type of the other vehicle traveling side by side.

Here, the ECU 20 can set each of the first offset threshold count and the second offset threshold count in accordance with the type of the other vehicle determined based on the peripheral vehicle information. A setting according to the type of the other vehicle can be done such that, for example, the first offset threshold count is set to 5 for a small four-wheeled vehicle such as a light vehicle, and the first offset threshold count is set to 10 for a large four-wheeled vehicle such as a truck. The second offset threshold count can similarly be set in accordance with the type of the other vehicle. The same value as the first offset threshold count may be set, or a value different from the first offset threshold count may be set in accordance with the type of the other vehicle. Offset control can be performed in accordance with the traveling scene of the vehicle by setting the first offset threshold count and the second offset threshold count in accordance with the type of the other vehicle.

In addition, the ECU 20 can change each of the first offset amount and the second offset amount to a decreased offset amount in accordance with an increase in the first accumulated offset count. For example, let N be the first accumulated offset count, OFF1$a$ be the initial value of the first offset amount, and OFF2$a$ be the initial value of the second offset amount.

When N=1, the first offset amount is OFF1$a$ (initial value), and the second offset amount is OFF2$a$ (initial value). When the first accumulated offset count increases to N=2, the ECU 20 sets OFF1$b$ as the first offset amount by decreasing OFF1$a$ (initial value), and sets OFF2$b$ as the second offset amount by decreasing OFF2$a$ (initial value). The ECU 20 can similarly change each offset amount to a gradually decreased offset amount in accordance with the increase in the first accumulated offset count.

Even in a case in which offset control is suppressed in accordance with the offset count, it is possible to suppress offset control without giving a sense of incongruity to the driver and the like by gradually decreasing the offset amount from the offset amount of the initial value in accordance with the increase in the accumulated offset count.

The ECU 20 sets the first mode or the second mode based on at least one of the automated driving level and traveling scene information that specifies the traveling scene of the vehicle, and performs offset control.

Figure 2A:
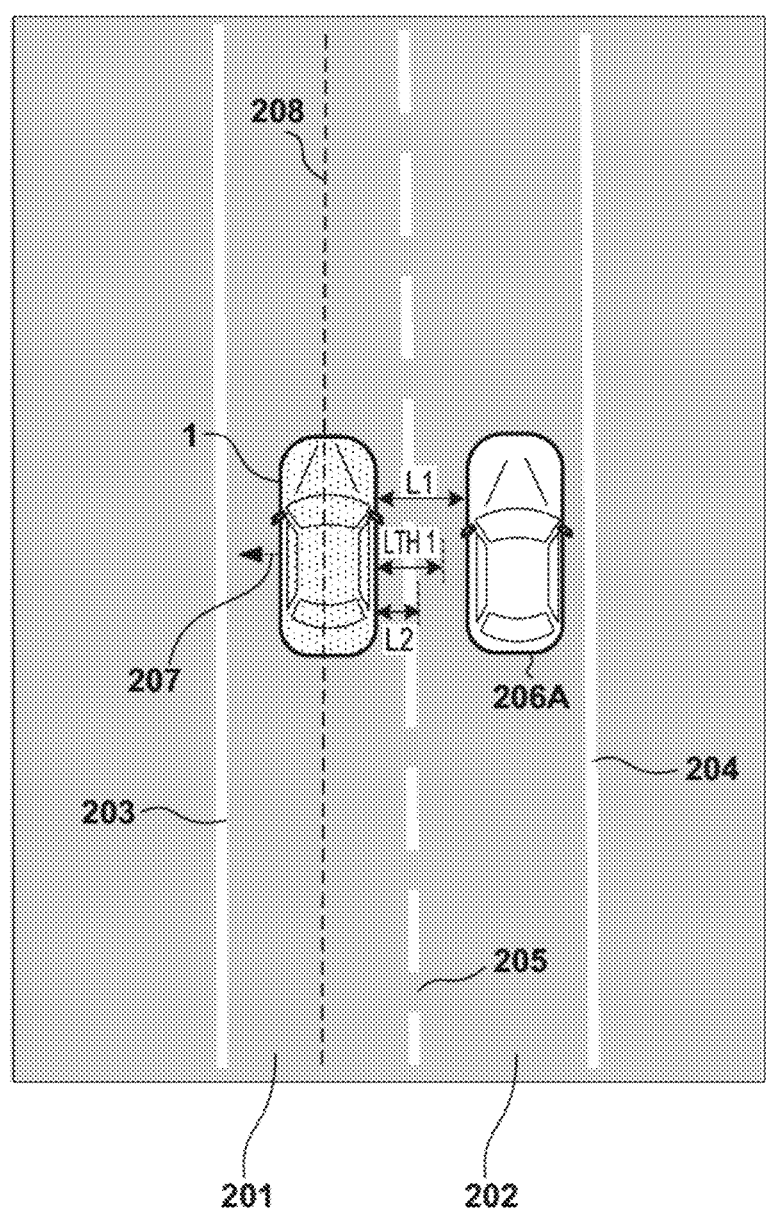
FIG. 2A is a view for exemplarily explaining control of offset amounts in a first mode and a second mode.

FIG. 2A is a view for exemplarily explaining control of the offset amount. In FIG. 2A, a lane 201 is divided by, for example, a division line 203 corresponding to a roadway edge marking or a road side zone and a division line 205 indicating a lane boundary to a lane 202 adjacent to the lane 201. In addition, the lane 202 adjacent to the lane 201 is divided by the division line 205 and a division line 204 corresponding to a roadway edge marking or a road side zone.

The vehicle 1 (self-vehicle) is traveling on the lane 201 along a lane center indicated by a broken line 208. As a dynamic target existing around the vehicle 1 (self-vehicle), another vehicle 206A is traveling on the lane 202 adjacent to the lane 201. The distance (interval) to the other vehicle 206A traveling side by side with the vehicle 1 (self-vehicle) is L1.

Control of the offset amount includes the first mode in which if the distance (interval) on the lateral side to the other vehicle 206A traveling side by side changes from the distance L1 to the first distance threshold LTH1 or less on the lateral side, the distance (interval) on the lateral side is increased by the first offset amount, and the second mode of the second offset amount whose offset amount is suppressed as compared to the first offset amount in the first mode. Here, in the second mode, suppressing the offset amount includes a decrease in the offset amount or an (offset inhibition) mode in which offset is not performed. The ECU 20 can change the selection of the first mode or the second mode in accordance with the traveling scene of the vehicle 1 (self-vehicle).

Referring to FIG. 2A, an arrow 207 indicates the offset direction of the vehicle 1 (self-vehicle). The ECU 20 causes the vehicle 1 (self-vehicle) to do offset traveling to move the traveling position of the vehicle 1 in the vehicle width direction such that the vehicle 1 (self-vehicle) proves in a direction (arrow 207) reverse to the direction to face the other vehicle 206A, that is, to increase the distance to the other vehicle 206A traveling side by side with the vehicle thereby controlling the distance (interval) between the vehicle 1 (self-vehicle) and the other vehicle 206A to a predetermined value.

(Third Mode)

Control of the offset amount also includes a third mode in which the offset amount is increased as compared to the second offset amount in the second mode, and the offset amount is suppressed as compared to the first offset amount in the first mode. As for the relationship between the offset amounts in the first mode, the second mode, and the third mode, the first offset amount is set to be larger than the third offset amount, and the third offset amount is set to be larger than the second offset amount.

That is, a relationship given by first offset amount>third offset amount>second offset amount is satisfied. In a state in which the distance between the other vehicle 206A and the vehicle 1 (self-vehicle), which are traveling side by side, is equal to or less than the first distance threshold LTH1 on the lateral side, the ECU 20 performs offset control in the first mode or the second mode.

In a case in which the ECU 20 is performing offset control in the first mode or the second mode, if the distance between the vehicle 1 (self-vehicle) and the other vehicle 206A traveling side by side with the vehicle becomes equal to or less than the second distance threshold L2 smaller than the first distance threshold, the ECU 20 controls to accelerate or decelerate the vehicle 1 (self-vehicle) or do offset traveling in the third offset amount based on the result of comparison between the distance to another vehicle in the front-and-rear direction in the same lane as the lane in which the vehicle is traveling and the distance threshold in the front-and-rear direction The ECU 20 can determine the type of the other vehicle traveling side by side based on peripheral vehicle information. The ECU 20 can perform offset control by setting the third offset amount based on the type of the other vehicle determined by the peripheral vehicle information. That is, concerning offset control in the first mode, the second mode, and the third mode, the ECU 20 can perform offset control by setting the first offset amount in the first mode, the second offset amount in the second mode, and the third offset amount in the third mode based on the type of the other vehicle determined by the peripheral vehicle information.

Here, the third mode is processing for emergency avoidance executed when the distance to the other vehicle traveling side by side has become equal to or less than the second distance threshold L2. When performing offset control, to ensure the distance to the other vehicle traveling side by side, the offset control is performed based on the set third offset amount.

Note that as exceptional processing of suppressing an excessive emergency avoidance operation in which the processing in the third mode is repetitively executed if the distance has become equal to or less than the second distance threshold L2, for example, a threshold count (third offset threshold count) to suppress execution of offset control in the third mode may be set. If the offset count exceeds the threshold count, execution of offset control in the third mode may be suppressed. Additionally, if the accumulated count (second accumulated offset count) that is equal to or less than the second distance threshold L2 on the lateral side increases beyond the third offset threshold count, the setting may be changed to decrease the third offset amount in accordance with the increase in the second accumulated offset count.

For example, in addition to performing offset control by setting the third offset amount in the third mode, the ECU 20 can also perform offset control by setting the third offset threshold count (frequency). In the third mode, the ECU 20 can perform offset control by increasing the offset count (frequency) as compared to the second offset threshold count (frequency) set in the second mode and setting the third offset threshold count (frequency) that is suppressed as compared to the first offset threshold count (frequency) set in the first mode. Setting of the third offset threshold count (frequency) is not limited to this example. For example, the offset count (frequency) may be increased as compared to the first offset threshold count (frequency) set in the first mode. In addition, the ECU 20 can set the third offset threshold count in accordance with the type of the other vehicle determined based on the peripheral vehicle information. When the third offset threshold count is set in accordance with the type of the other vehicle, offset control can be performed in accordance with the traveling scene of the vehicle.

The ECU 20 can perform control such that if the distance to the other vehicle traveling side by side becomes equal to or less than the second distance threshold L2, the second accumulated offset count (frequency) is incremented, if the incremented second accumulated offset count (frequency) is equal to or less than the offset count (equal to or less than the third offset threshold count (frequency)) set in the third mode, offset control is performed, and if the second accumulated offset count exceeds the set offset count (third offset threshold count (frequency)), execution of offset control is suppressed.

Additionally, if the second accumulated offset count increases beyond the third offset threshold count, the ECU 20 can change the third offset amount to an offset amount obtained by decreasing the third offset amount in accordance with an increase in the first accumulated offset count. For example, let NN be the second accumulated offset count and NS be the third offset threshold count. Also, let OFF3$a$ be the initial value of the set third offset amount. If the second accumulated offset count is 1 or more and is equal to or less than the third offset threshold count (1≤NN≤NS), the ECU 20 performs offset control based on the initial value (OFF3$a$ (initial value)) of the set third offset amount. If the second accumulated offset count increases beyond the third offset threshold count (NN>NS), the third offset amount is changed to a decreased offset amount in accordance with the increase in the second accumulated offset count. For example, if the second accumulated offset count increases to NN=NS+1, the ECU 20 can set OFF3b as the third offset amount by decreasing OFF3a (initial value). It is possible to suppress offset control without giving a sense of incongruity to the driver and the like by gradually decreasing the offset amount from the offset amount of the initial value in accordance with the increase in the accumulated offset count.

The ECU 20 can control acceleration or deceleration in accordance with the position of the other vehicle 206A traveling side by side with the vehicle 1 (self-vehicle). For example, if the other vehicle 206A is located on the front side of the vehicle 1 (self-vehicle), as shown FIG. 2, the ECU 20 controls to decelerate the vehicle 1 (self-vehicle).

In addition, if the other vehicle 206A is located on the rear side of the vehicle 1 (self-vehicle), the ECU 20 controls to accelerate the vehicle 1 (self-vehicle). When acceleration/deceleration is thus controlled in accordance with the position of the other vehicle 206A relative to the vehicle 1, interference with the other vehicle 206A approaching the lateral side can be avoided.

Figure 2B:
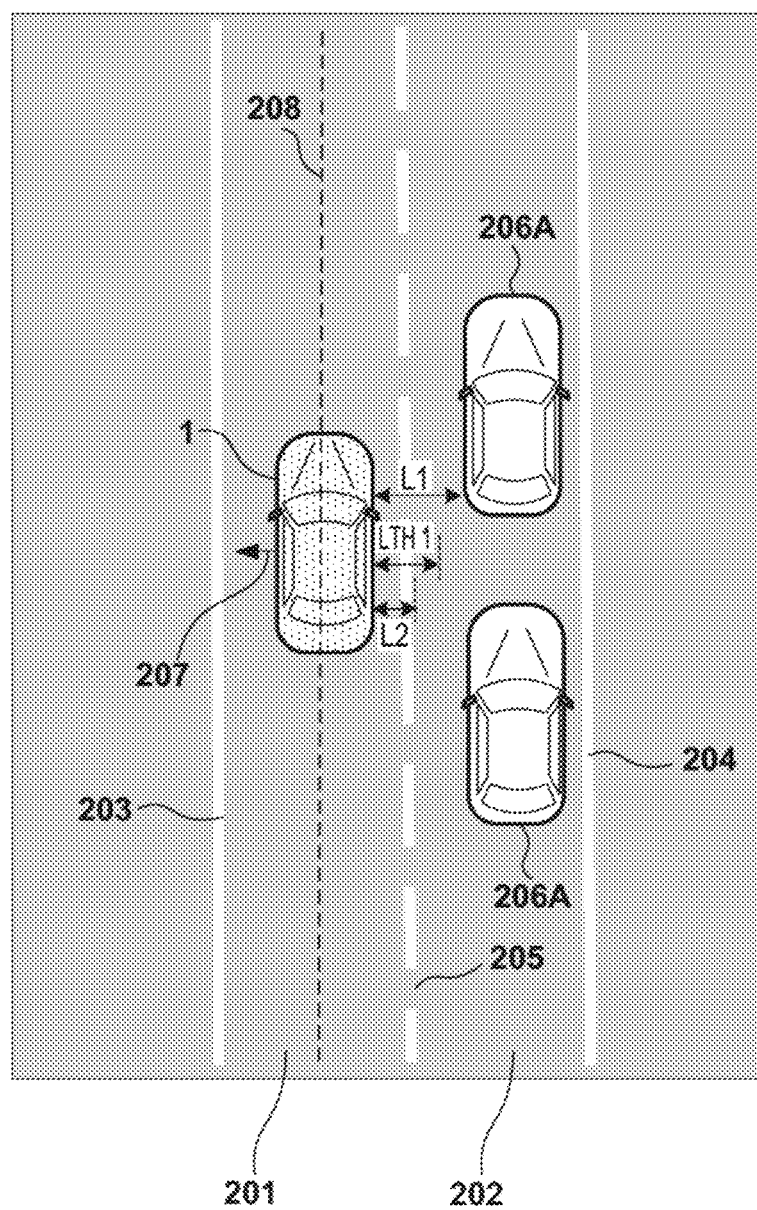
FIG. 2B is a view for exemplarily explaining control of an offset amount.
Figure 2C:
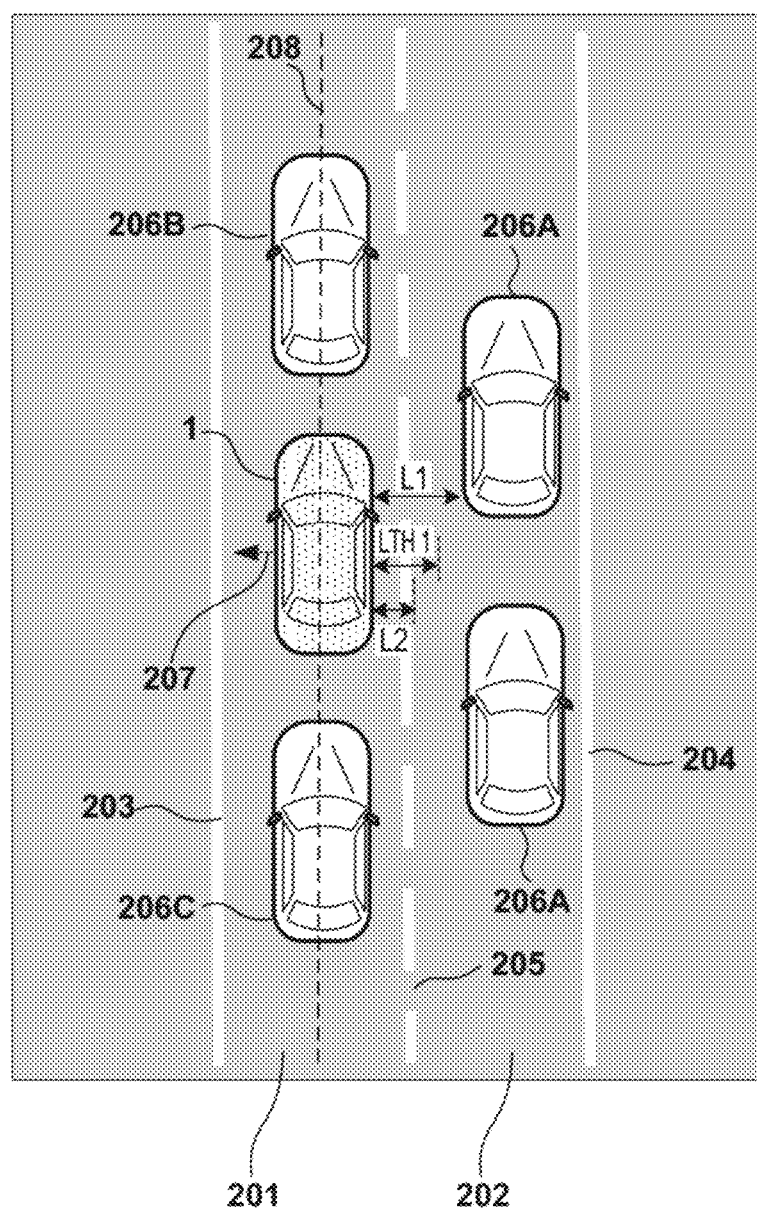
FIG. 2C is a view for exemplarily explaining control of an offset amount.

The example of FIG. 2B shows a case in which any other vehicle does not exist on the front and rear sides of the vehicle 1 (self-vehicle) on the lane 201 in which the vehicle 1 (self-vehicle) travels. For example, as shown in FIG. 2C, if another vehicle 206B or another vehicle 206C exists on one of the front and rear sides of the vehicle 1 (self-vehicle), the ECU 20 controls to offset the vehicle 1 (self-vehicle) in the direction of the arrow 207 shown in FIG. 2C by the third offset amount with priority over acceleration or deceleration. If priority is given to offset control without performing acceleration or deceleration, it is possible to avoid interference with the other vehicle 206A on the lateral side while avoiding interference with the other vehicle 206B or 206C in the front-and-rear direction.

Figure 2D:
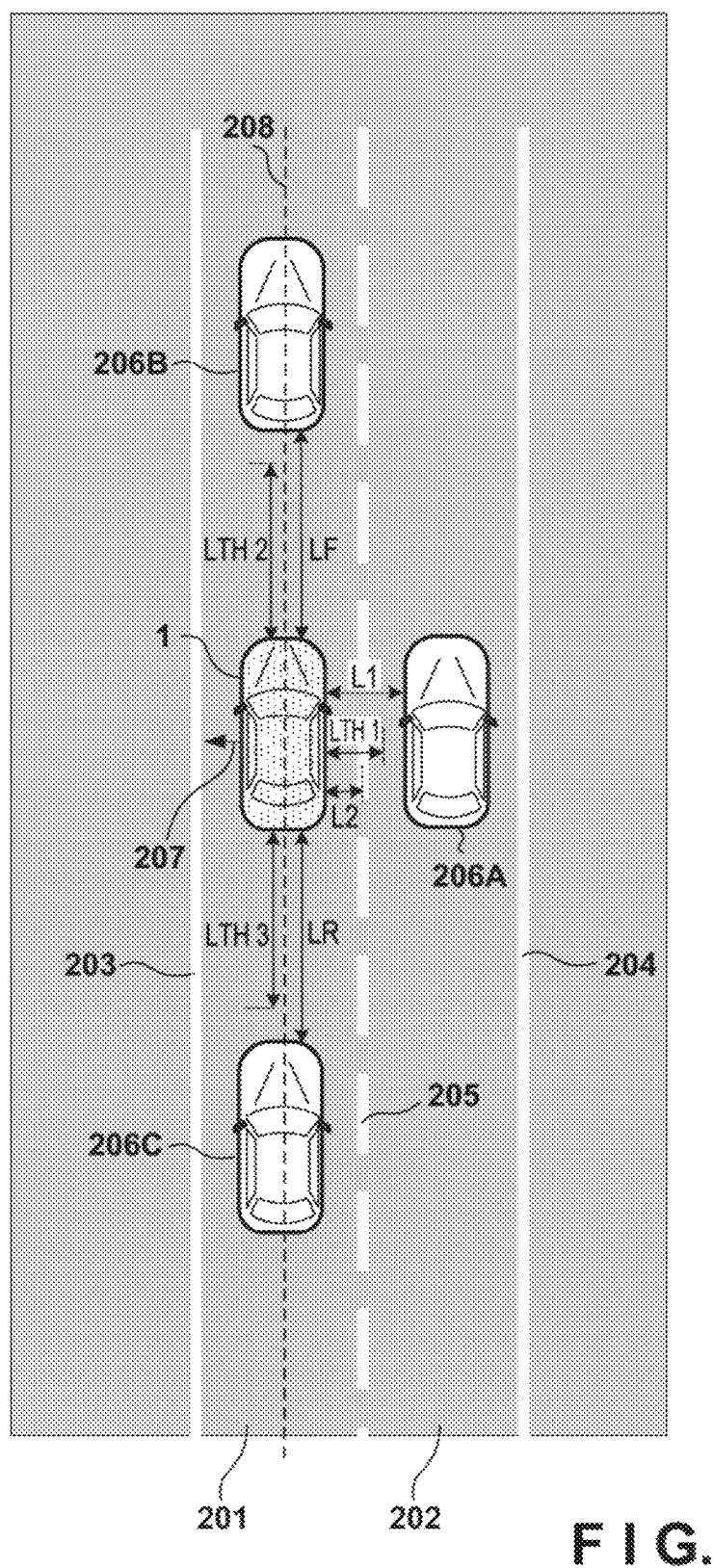
FIG. 2D is a view for exemplarily explaining control of an offset amount in a third mode.

Furthermore, even in a case in which the other vehicles 206B and 206C exist in the front-and-rear direction, for example, if following distances (LF and LR) in the front-and-rear direction are compared with thresholds (LTH2 and LTH3), and there is an interval (space) to allow the vehicle 1 to move in the front-and-rear direction, as shown in FIG. 2D, the vehicle 1 (self-vehicle) may be accelerated/decelerated to eliminate the side-by-side traveling state with the other vehicle 206A traveling side by side. The traveling states of the vehicle 1 and the other vehicle 206A in FIG. 2D are similar to those in FIG. 2A.

Based on the peripheral vehicle information, if the other vehicles (206B and 206C in FIG. 2D) in the front-rand-rear direction on the same lane as the lane in which the vehicle 1 is traveling exist in a distance less than the distance thresholds (LTH2 and LTH3) in the front-and-rear direction, the ECU 20 performs control with priority on the offset control over the control to accelerate or decelerate the vehicle 1.

In addition, if the other vehicles (206B and 206C in FIG. 2D) in the front-and-rear direction on the same lane exist in a distance equal to or more than the distance thresholds (LTH2 and LTH3) in the front-and-rear direction, the ECU 20 can perform control with priority on the control to accelerate or decelerate the vehicle over the offset control.

In FIG. 2D, the other vehicle 206B is a preceding vehicle traveling on the front side of the vehicle 1 (self-vehicle), the other vehicle 206C is a following vehicle traveling on the rear side of the vehicle 1 (self-vehicle), and the other vehicles 206B and 206C are traveling on the same lane 201 as the vehicle 1 (self-vehicle).

The distance (interval) between the vehicle 1 (self-vehicle) and the other vehicle 206A traveling side by side is L1. In addition, the distance (interval) between the vehicle 1 (self-vehicle) and the other vehicle 206B traveling on the front side of the vehicle 1 (self-vehicle) is LF, and the distance (interval) between the vehicle 1 (self-vehicle) and the other vehicle 206C traveling on the rear side is LR.

FIG. 2E is a flowchart for explaining the procedure of processing of the third mode in the case shown in FIG. 2D. In step S11, the distance to the other vehicle 206A traveling side by side is measured. In step S12, the measured distance and the second distance threshold L2 on the lateral side are compared. If the measured distance is more than the second distance threshold L2 on the lateral side in the comparison of step S12 (NO in step S12), the processing is ended.

On the other hand, if the measured distance is equal to or less than the second distance threshold L2 on the lateral side in the determination of step S12, the ECU 20 advances the process to step S13.

In step S13, the distances to the other vehicles in the front-and-rear direction on the same lane as the lane in which the vehicle 1 is traveling are measured based on the detection results of the lidars 42 or the radars 43. In step S14, the ECU 20 compares the measured distances (LF and LR) to the other vehicles in the front-and-rear direction with the distance thresholds (LTH2 and LTH3) in the front-and-rear direction.

The ECU 20 performs the comparison to determine whether the distance LF to the other vehicle 206B (preceding vehicle) traveling on the front side of the vehicle 1 (self-vehicle) is equal to or more than the threshold LTH2 in the front direction and whether the distance LR to the other vehicle 206C (following vehicle) traveling on the rear side of the vehicle 1 (self-vehicle) is equal to or more than the threshold LTH3 in the rear direction. Here, the threshold LTH2 it the front direction and the threshold LTH3 in the rear direction may have the same value, or different values may be set.

If the distances from the vehicle 1 (self-vehicle) are equal to or more than the thresholds in the front-and-rear direction in both the front direction and the rear direction in the comparison of step S14 (LF≥LTH2 and LR≥LTH3), the ECU 20 advances the process to step S15.

In step S15, the ECU 20 selects one of the front direction and the rear direction. For example, a priority order is set for each of the front direction and the rear direction. If the conditions of the thresholds are satisfied in the front direction and the rear direction, the ECU 20 accelerates or decelerates the vehicle 1 (self-vehicle) in accordance with the set priority order. This can eliminate the side-by-side traveling state and avoid interference with the other vehicle 206A traveling side by side.

If the distance is equal to or more than the threshold only in one of the front direction and the rear direction in the comparison of step S14, for example, if the condition of the threshold is satisfied only in the front direction (LF≥LTH2, and LR<LTH3), or if the condition of the threshold is satisfied only in the rear direction (LF<LTH2, and LR≥LTH3), the ECU 20 advances the process to step S16 to accelerate or decelerate the vehicle 1 (self-vehicle) in the direction in which the distance is equal to or more than the threshold. This can eliminate the side-by-side traveling state and avoid interference with the other vehicle 206A traveling side by side.

If the distances are less than the distance thresholds in the front-and-rear direction in the comparison of step S14 (LF<LTH2, and LR<LTH3), the ECU 20 advances the process to step S17.

In step S17, the ECU 20 controls the vehicle 1 (self-vehicle) to offset it in the direction of the arrow 207 shown in FIG. 2D by the third offset amount with priority over acceleration or deceleration. If priority is given to offset control without performing acceleration or deceleration, it is possible to avoid interference with the other vehicle 206A on the lateral side while avoiding interference with the other vehicle 206B or 206C in the front-and-rear direction.

(Automated Driving Level)

In the traveling control according to this embodiment, the ECU 20 controls the offset amount based on at least one of the automated driving level and the traveling scene information representing the situation around the vehicle. Here, the traveling scene information includes at least one of map information, position information of the vehicle 1 (self-vehicle) on the map information, and peripheral vehicle information concerning a target located around the vehicle 1.

In addition, the automated driving level is operation control information classified into a plurality of stages in accordance with the degree of control by the control unit (for example, the ECU 20) concerning operations concerning acceleration, steering, and braking of the vehicle and the degree of involvement in a vehicle operation by the driver who operates the vehicle. For example, the following automated driving levels can be set. Note that the following classification is merely an example, and the scope of the present invention is not limited to this example.

(1) Level 1 (Single Type Automated Driving)

In level 1, the traveling control apparatus performs operation control of one of acceleration, steering, and braking of the vehicle. All operations other than those controlled by the traveling control apparatus need involvement of the driver. In level 1, the driver is required to be ready for safe driving at any time (surroundings monitoring duty is required).

(2) Level 2 (Complex Automated Driving)

In level 2, the traveling control apparatus performs a plurality of control operations of acceleration, steering, and braking of the vehicle. The degree of involvement of the driver is lower than in level 1. However, in level 2 as well, the driver is required to be ready for safe driving at any time (surroundings monitoring duty is required).

(3) Level 3 (Advanced Automated Driving)

In level 3, the traveling control apparatus performs all operations concerning acceleration, steering, and braking. Only when the traveling control apparatus requests, the driver copes with the operation of the vehicle. In level 3, during traveling by automated driving, the surroundings monitoring duty is not required of the driver. In level 3, the degree of involvement of the driver is lower than in level 2.

(4) Level 4 (Fully Automated Driving)

In level 4, the traveling control apparatus performs all operations concerning acceleration, steering, and braking, and the driver is not involved in the operation of the vehicle at all. In level 4, automated driving is performed throughout the course the vehicle travels. During traveling by automated driving, the surroundings monitoring duty is not required of the driver. In level 4, the degree of involvement of the driver is lower than in level 3.

The following description will be made assuming that an automated driving level that requires the surroundings monitoring duty of the driver is an automated driving level of low level, and an automated driving level that does not require the surroundings monitoring duty of the driver is an automated driving level of high level.

<Offset Control According to Traveling Scene>

(Processing in Following in Congestion)

FIG. 3 is a view exemplarily showing the contents of offset control according to traveling scenes. In FIG. 3, at the time of following in congestion follow, the ECU 20 preferentially executes offset control in the second mode. If the distance to the other vehicle (for example, 206A in FIG. 2A) traveling side by side becomes less than the threshold, the ECU 20 can perform offset control in the third mode for the state needing emergency avoidance.

FIG. 4 is a flowchart for explaining the procedure of offset control during following in congestion. In step S20, the vehicle speed sensor 7c detects the vehicle speed of the vehicle 1 (self-vehicle). In step S21, the ECU 20 compares the vehicle speed detected by the vehicle speed sensor 7c with a predetermined vehicle speed threshold.

If the detected vehicle speed is equal to or more than the speed threshold in the comparison of step S21 (NO in step S21), the ECU 20 advances the process to step S29. In step S29, the ECU 20 sets, for example, the first mode as the offset mode, and ends the processing.

On the other hand, if the vehicle speed is less than the speed threshold in the comparison of step S21 (YES in step S21), the ECU 20 advances the process to step S22.

In step S22, the presence/absence of another vehicle in the front direction of the vehicle 1 (self-vehicle) is detected by the lidars 42 or the radars 43. If any other vehicle is not detected in step S23 (NO in step S23), the ECU 20 advances the process to step S29 to set the first mode as the offset mode, and ends the processing. Here, to detect another vehicle in the front direction of the vehicle 1 (self-vehicle), the detection result of peripheral vehicle information can be used.

On the other hand, in step S23, if another vehicle as a tracking target is detected on the same lane as the lane in which the vehicle 1 (self-vehicle) is traveling (YES in step S23), the ECU 20 advances the process to step S24, and determines in step S24 that following in congestion is in progress. In step S25, the ECU 20 sets the second mode as the offset mode.

In step S26, if the distance to the other vehicle traveling side by side becomes equal to or less than the second distance threshold L2 on the lateral side which is less than the first distance threshold on the lateral side, it is determined that this state needs emergency avoidance (YES in step S26), and the ECU 20 advances the process to step S27.

In step S27, the ECU 20 changes the second mode as the offset mode to the third mode. On the other hand, if the state does not need emergency avoidance in the determination of step S26, that is, if the distance to the another vehicle traveling side by side is more than the second distance threshold L2 on the lateral side and equal to or less than first distance threshold LTH1, in step S28, the ECU 20 maintains the second mode as the offset mode, and ends the processing.

(Offset Control According to Road Type)

The ECU 20 can perform offset control by setting an offset mode according to each of, for example, an automobile road including an expressway and a non-automobile road including a general road other than automobile roads. In FIG. 3, if the vehicle 1 (self-vehicle) travels on a non-automobile road, the ECU 20 preferentially executes offset control in the second mode. If the distance to the other vehicle (for example, 206A in FIG. 2) traveling side by side becomes equal to or less than the second distance threshold L2, the ECU 20 performs offset control in the third mode for the state needing emergency avoidance.

In addition, when the vehicle 1 (self-vehicle) travels on an automobile road, the ECU 20 can perform offset control in the first mode and the second mode. The offset control in the first mode is executed with priority over the second offset control. If the distance to the other vehicle 206A traveling side by side becomes less than the threshold, that is, if the state changes to the state needing emergency avoidance, offset control in the first mode is performed, thereby performing emergency avoidance.

FIG. 5 is a flowchart for explaining the procedure of offset control according to a road type. In step S30, the ECU 22 and the ECU 23 acquire peripheral vehicle information from the lidars 42 and the radars 43. The ECU 22 and the ECU 23 extract a target (object) existing around the self-vehicle as peripheral vehicle information. Targets include, for example, static targets (for example, stationary objects such as road structures including a lane, a road width, a traffic signal, a curbstone, a sign, and a guardrail) that do not move along with the elapse of time, and dynamic objects (for example, moving objects such as another vehicle and a pedestrian) that move along with the elapse of time. The target information extracted by the ECU 22 and the ECU 23 is input to the ECU 20.

In step S31, based on in processing of the detection result or communication result of the gyro sensor 5, the GPS sensor 24b, and the communication device 24c, the ECU 24 acquires map information and position information of the vehicle 1 (self-vehicle) on the map information.

In step S32, the ECU 20 determines the type of the road on which the vehicle 1 (self-vehicle) is traveling. Based on information (for example, target information such as a sign indicating a road width or a speed limit) concerning a static target included in the peripheral vehicle information acquired in step S30 and map information and position information acquired in step S31, the ECU 20 determines the type of the road (for example, a non-automobile road or an automobile road) on which the vehicle 1 (self-vehicle) is traveling. Note that the determination of the road type may be done by combining, for example, the information of the vehicle speed detected by the vehicle speed sensor 7c. For example, a condition representing whether the vehicle speed is equal to or more than a predetermined speed may be combined.

If the vehicle 1 (self-vehicle) is traveling on an automobile road, the ECU 20 advances the process to step S37. If the vehicle 1 (self-vehicle) is traveling on an automobile road the ECU 20 executes offset control in the first mode with priority over the second offset control, and sets the first mode as the offset mode. In addition, if the distance to the other vehicle traveling side by side becomes equal to or less than the second distance threshold L2, and the state changes to the state needing emergency avoidance, the ECU 20 performs offset control in the first mode, thereby performing emergency avoidance.

On the other hand, if the vehicle 1 (self-vehicle) is traveling on a non-automobile road in the determination of step S32, the ECU 20 advances the process to step S33. In step S33, the ECU 20 sets the second mode as the offset mode.

In step S34, if the distance to the other vehicle traveling side by side becomes equal to or less than the second distance threshold L2 on the lateral side, it is determined that this state needs emergency avoidance (YES in step S34), and the ECU 20 advances the process to step S35.

In step S35, the ECU 20 changes the second mode as the offset mode to the third mode. On the other hand, if the state does not need emergency avoidance in the determination of step S34, that is, if the distance to the another vehicle traveling side by side is more than the second distance threshold L2 on the lateral side and equal to or less than first distance threshold LTH1, in step S36, the ECU 20 maintains the second mode as the offset mode, and ends the processing.

(Transition of Automated Driving Level)

The level of automated driving changes to a more advanced level from level 1 to level 4. The level of automated driving can change (transition) from a lower level to a more advanced level or change (transition) from a more advanced level to a lower level in accordance with traveling scene information.

Here, the automated driving levels (level 1 and level 2) that require the surroundings monitoring dirty of the driver are defined as automated driving levels of low level, and the automated driving levels (level 3 and level 4) that do not require the surroundings monitoring duty of the driver are defined as automated driving levels of high level.

As shown in FIG. 3, in the automated driving level of high level, the ECU 20 preferentially executes offset control in the second mode. If the distance to the other vehicle (for example, 206A in FIG. 2A) traveling side by side becomes equal to or less than the second distance threshold L2 on the lateral side, it is determined that the state needs emergency avoidance, and offset control in the third mode is performed.

Figure 6:
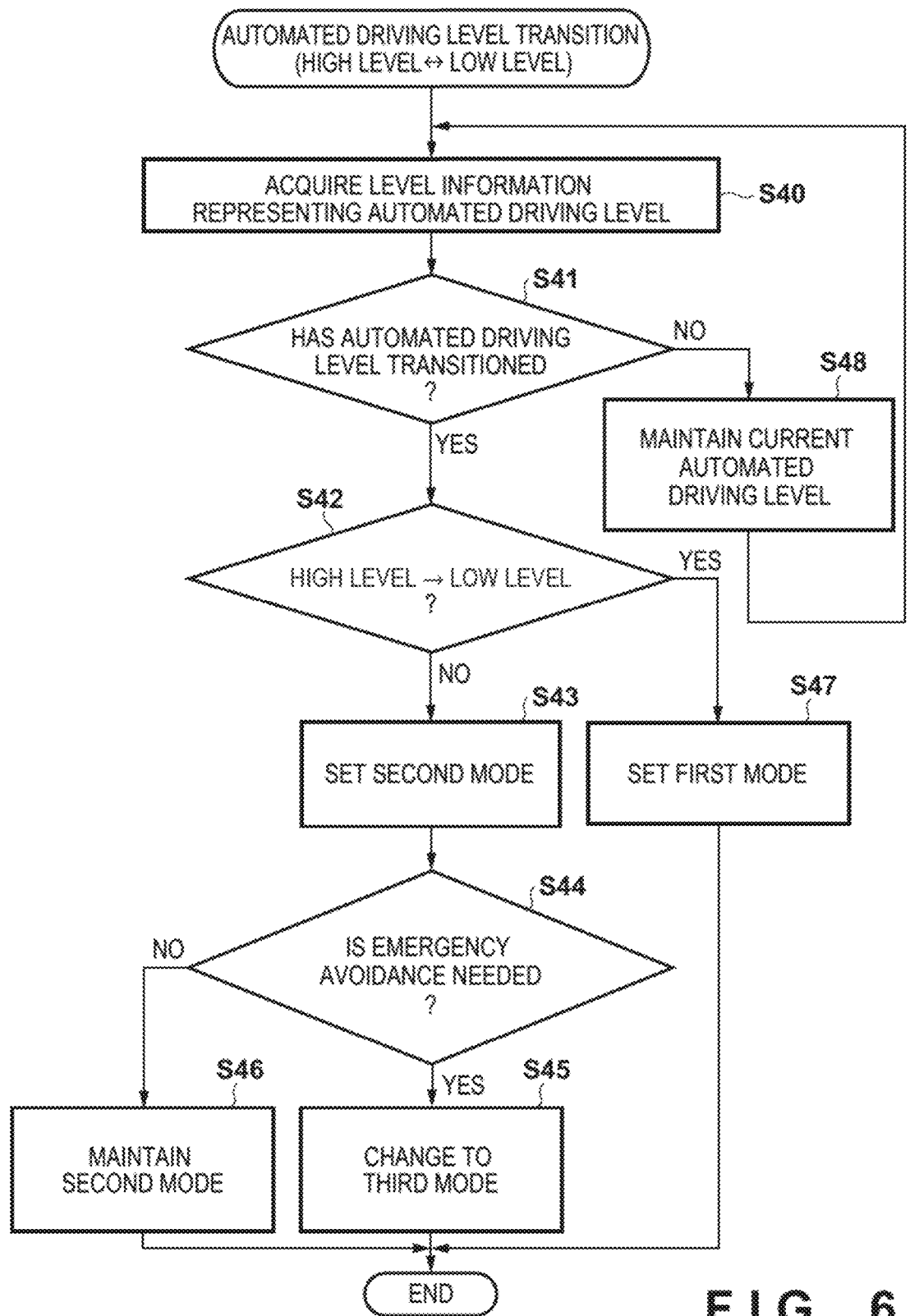
FIG. 6 is a flowchart for explaining the procedure of offset control in a case in which an automated driving level transitions.

Additionally, in the automated driving level of low level, the ECU 20 preferentially executes offset control in the first mode. If the distance to the other vehicle traveling side by side becomes equal to or less than the second distance threshold L2 on the lateral side, that is, if the state changes to the state needing emergency avoidance, offset control in the first mode is performed, thereby performing emergency avoidance FIG. 6 is a flowchart for explaining the procedure of offset control in a case in which the automated driving level transitions. In step S40, the ECU 20 acquires level information representing the set automated driving level. The ECU 20 sequentially acquires the level information at a predetermined timing, and specifies whether the currently set automated driving level is an automated driving level of high level or an automated driving level of low level.

In step S41, the ECU 20 determines whether the level information acquired at the predetermined timing has changed. If the level information has not changed based on the determination result (NO in step S41), the ECU 20 advances the process to step S48.

In step S48, the ECU 20 maintains the currently set automated chip 3 level, and returns the process to step S41.

On the other hand, if the level information has changed in the determination of step S41 (YES in step S41), the ECU 20 advances the process to step S42.

In step S42, the ECU 20 determines whether the change of the level information is a transition from a high level to a low level. If the change is a transition from a high level to a low level (YES in step S42), the ECU 20 advances the process to step S47.

In step S47, the ECU 20 preferentially executes the offset control in the first mode, and sets the first mode as the offset mode. In addition, if the distance to the other vehicle traveling side by side becomes equal to or less than the second distance threshold L2 on the lateral side, and emergency avoidance is necessary, the ECU 20 performs the offset control in the first mode, thereby performing emergency avoidance.

On the other hand, if it is determined in step S42 that the change of the level information is a transition from a low level to a high level (NO in step S42), the ECU 20 advances the process to step S43. In step S43, the ECU 20 sets the second mode as the offset mode. For example, in the following in congestion described above, the traveling of the vehicle 1 (self-vehicle) follows the traveling of the preceding vehicle on the front side. In a place where the vehicle on the front side can travel, the vehicle 1 (self-vehicle) can also travel. Hence, the surroundings monitoring duty of the driver is not necessary, and the processing from step S43 is similar to the processing from step S25 in FIG. 4 described concerning processing during following in congestion.

In step S44, if the distance to the other vehicle traveling side by side becomes equal to or less than the second distance threshold L2 on the lateral side, which is smaller than the first distance threshold on the lateral side, emergency avoidance is necessary (YES in step S44). Hence, the ECU 20 advances the process to step S45.

In step S45, the ECU 20 changes the second mode to the third mode as the offset mode. On the other hand, if it is determined in step S44 that emergency avoidance is not necessary, that is, if the distance to the other vehicle traveling side by side is more than the second distance threshold L2 on the lateral side and equal to or less than the first distance threshold LTH1, in step S46, the ECU 20 maintains the second mode as the offset mode, and ends the processing.

(Transition Between Manual Driving and Automated Driving)

The transition between manual driving in which the driver executes all driving tasks without an intervention of the control unit (for example, the ECU 20 and the like) that controls automated driving and automated driving in which the control unit intervenes in a driving task or executes all driving tasks will be described next.

As shown in FIG. 3, in the transition from manual driving to automated driving, the ECU 20 preferentially executes offset control in the second mode. If the distance to the other vehicle (for example, 206A in FIG. 2A) traveling side by side becomes equal to or less than the second distance threshold L2, emergency avoidance is necessary. Hence, the ECU 20 performs the offset control in the third mode. Additionally, in the transition from automated driving to manual driving, the ECU 20 does not perform offset control, and leaves the driving operation to the driver. The change (transition) between manual driving and automated driving can be done by, for example, an operation member such as a switch (not shown). The ECU 20 can switch between manual driving and automated driving by an operation input of the operation member.

Figure 7:
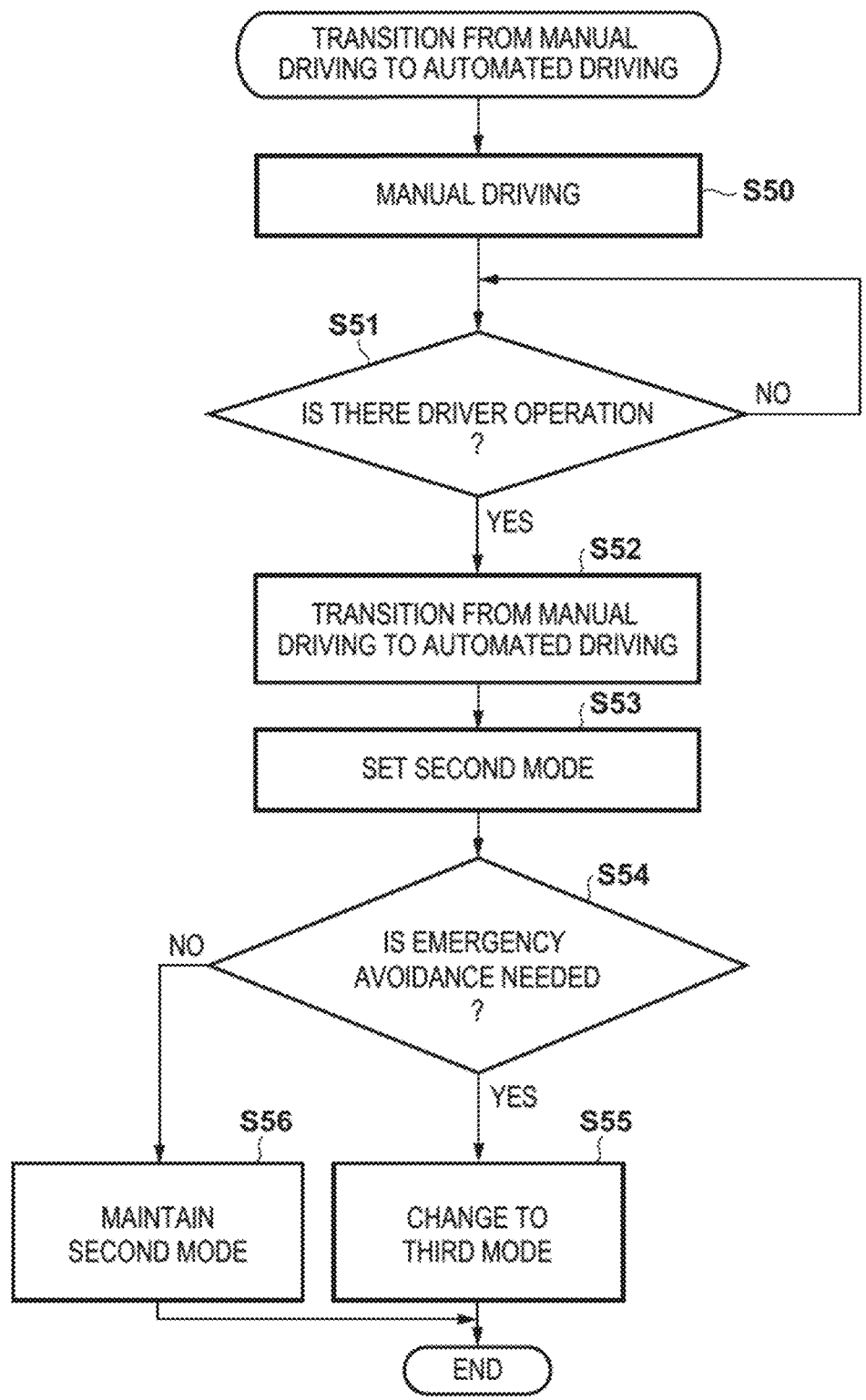
FIG. 7 is a flowchart for explaining the procedure of offset control in a case of a transition from manual driving to automated driving.

FIG. 7 is a flowchart for explaining the procedure of offset control in a case of a transition from manual driving to automated driving. In step S50, manual driving by the driver is being performed. In step S51, the ECU 20 stands by in a state for waiting for a driver operation input. If an operation from the operation member by the driver is input (YES in step S51), the ECU 20 advances the process to step S52.

In step S52, the ECU 20 controls the vehicle 1 (self-vehicle) to change (transition) from manual driving to automated driving. In step S53, the ECU 20 sets the second mode as the offset mode.

In step S54, if the distance to the other vehicle traveling side by side becomes equal to or less than the second distance threshold L2 on the lateral side, emergency avoidance is necessary (YES in step S54). Hence, the ECU 20 advances the process to step S55.

In step S55, the ECU 20 changes the second mode to the third mode as the offset mode. On the other hand, if it is determined in step S54 that emergency avoidance is not necessary that is, if the distance to the other vehicle traveling side by side is more than the second distance threshold L2 on the lateral side and equal to or less than the first distance threshold LTH1, in step S56, the ECU 20 maintains the second mode as the offset mode, and ends the processing.

Figure 8:
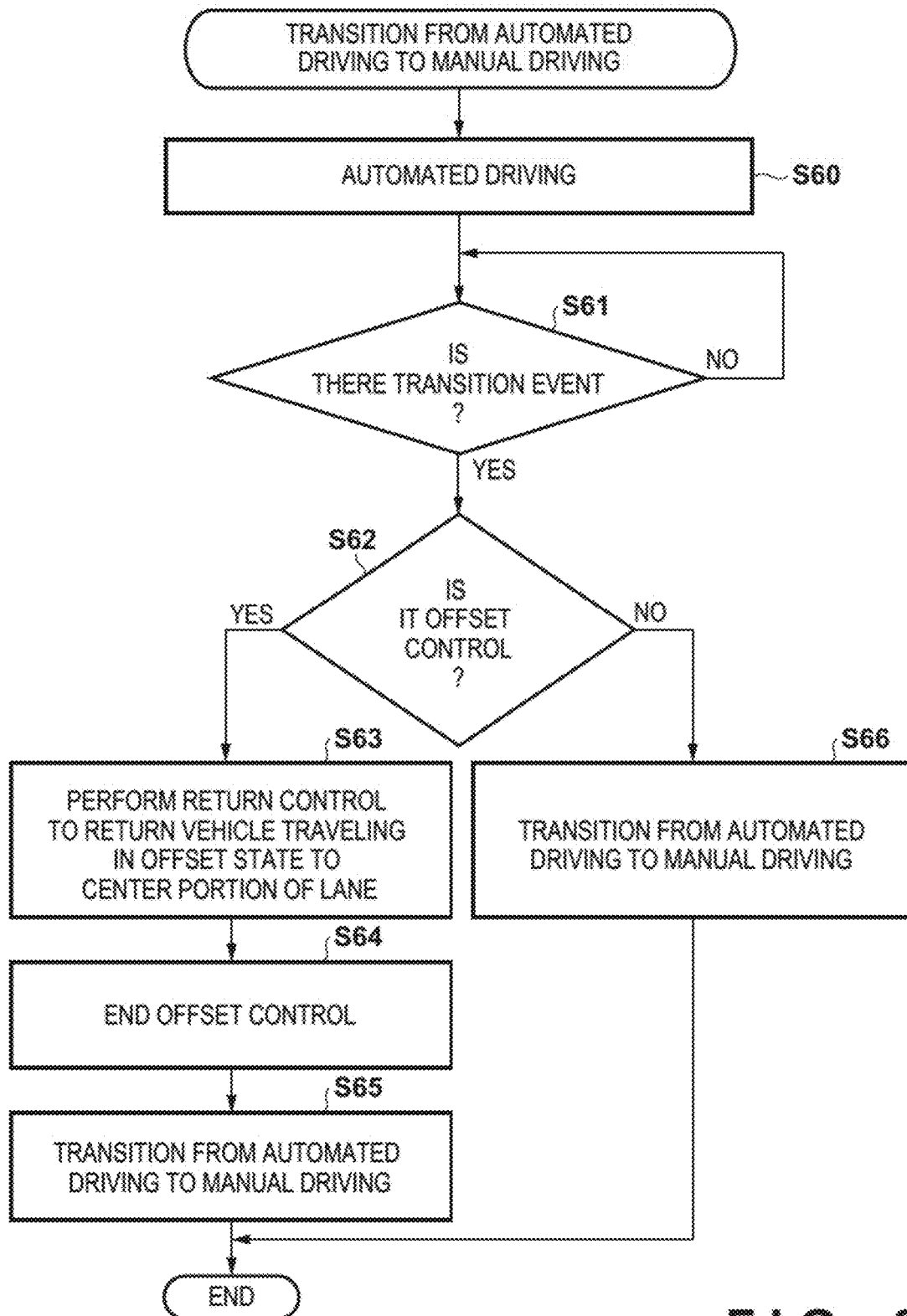
FIG. 8 is a flowchart for explaining the procedure of offset control in a case of a transition from automated driving to manual driving.

FIG. 8 is a flowchart for explaining the procedure of offset control in a case of a transition from automated driving to manual driving. In step S60, automated driving to a set destination is being performed under the control of the ECU 20.

In step S61, the ECU 20 determines the presence/absence of a transition event in which a transition from automated driving to manual driving occurs. Here, as the transition event in which a transition from automated driving to manual driving occurs, for example, the ECU 20 can change the control state of the vehicle 1 (self-vehicle) such that it transitions from automated driving to manual driving by an operation input from an operation member such as a switch (not shown).

As another transition event, when the vehicle arrives at the destination by traveling in automated driving, the ECU 20 can change the control state of the vehicle 1 (self-vehicle) such that it transitions from automated driving to manual driving.

Alternatively, as still another transition event, if peripheral vehicle information necessary for executing automated driving cannot be obtained, for example, if information necessary for executing automated driving cannot be detected by the cameras 41, the lidars 42, and the radars 43 due to the influence of a weather condition or a traveling environment such as a road surface, and a target existing around the self-vehicle cannot be extracted, the ECU 20 can change the control state of the vehicle 1 (self-vehicle) such that it transitions from automated driving to manual driving. Note that the above-described transition events in which a transition from automated driving to manual driving occurs are merely examples, and are not limited to these examples.

In step S61, the ECU 20 stands by in a state for waiting, for the occurrence of a transition event in which a transition from automated driving to manual driving occurs (NO in step S61). If a transition event occurs (YES in step S61), the ECU 20 advances the process to step S62.

In step S62, the ECU 20 judges whether the control state of the vehicle 1 (self-vehicle) is the offset control state. If the control state of the vehicle 1 (self-vehicle) is not the offset control state in step S62), the ECU 20 advances the process to step S66.

In step S66, the ECU 20 changes the control state of the vehicle 1 (self-vehicle) such that it transitions from automated driving to manual driving, and ends the processing.

On the other hand, if it is determined in step S62 that the control state of the vehicle 1 (self-vehicle) is the offset control state (YES in step S62), the ECU 20 advances the process to step S63.

In step S63, the ECU 20 performs return control to return the vehicle 1 (self-vehicle) traveling in the offset state to the center portion of the lane in which the vehicle traveled before the offset control. In the return control, the ECU 20 obtains an offset amount needed to cancel the offset amount. For example, in the offset control of automated driving, if the offset control is performed in the first mode, the first offset amount is obtained. If the offset control is performed in the second mode, the second offset amount is obtained. If the offset control is performed in the third mode, the third offset amount is obtained.

The ECU 20 calculates the magnitude of a steering assist torque needed to return the obtained offset amount to the original offset amount, and inputs it to the ECU 21. Based on the calculation result of the steering assist torque input from the ECU 20, the ECU 21 controls the electric power steering device 3 to generate a driving force to automatically steer the front wheels of the vehicle 1.

The ECU 21 controls to gradually decrease the steering assist torque as the vehicle 1 (self-vehicle) returns to the lane center portion and make the steering assist torque zero in a state in which the vehicle has returned to the lane center portion. By gently ending offset control by such return control, the driver can take over the driving operation in a state to more easily drive when automated driving is transitioned to manual driving.

In step S64, the ECU 20 ends the offset control. In step S65, the ECU 20 changes the control state of the vehicle 1 (self-vehicle) such that it transitions from automated driving to manual driving, and ends the processing.

<Summary of Embodiment>

Arrangement 1. A traveling control apparatus according to the above-described embodiment is a traveling control apparatus (for example, 100) configured to control automated driving traveling of a vehicle (for example, 1) based on a set automated driving level (for example, level 1-level 4), characterized by comprising:

acquisition means (for example, 22, 23, 24a, 24b, 24c, 41, 42, 43, CAM, S1-S5) for acquiring traveling scene information that specifies a traveling scene of the vehicle; and control means (for example, 20, COM) for performing offset control to offset a traveling position of the vehicle in a vehicle width direction to increase a distance to another vehicle (for example, 206A) traveling side by side with the vehicle, wherein the control means (20, COM)

has, as modes of the offset control, a first mode in which if the distance to the other vehicle becomes not more than a first distance threshold (LTH1) on a lateral side, the distance is increased by a first offset amount, and a second mode of a second offset amount whose offset amount is suppressed as compared to the first offset amount in the first mode, and performs the offset control by setting one of the first mode and the second mode based on at least one of the traveling scene information and the automated driving level.

According to the traveling control apparatus of arrangement 1, it is possible to control the offset amount to the other vehicle in accordance with the traveling scene of the vehicle.

Arrangement 2. The traveling control apparatus (100) according to the above-described embodiment is characterized in that the traveling scene information includes at least one of map information, position information of the vehicle on the map information, and peripheral vehicle information concerning a target located around the vehicle.

According to the traveling control apparatus of arrangement 2, it is possible to perform the offset control by considering, as the traveling scene information, the map information, the position information of the vehicle, and the peripheral vehicle information concerning a target located around the vehicle.

Arrangement 3. The traveling control apparatus (100) according to the above-described embodiment is characterized in that in a case in which the control means (20, COM) is performing the offset control in one of the first mode and the second mode, if the distance to the other vehicle becomes not more than a second distance threshold (L2) smaller than the first distance threshold (LTH1) on the lateral side, the control means (20, COM) accelerates or decelerates the vehicle based on a comparison result (for example, S14 in FIG. 2E) between the distance to the other vehicle (for example, 206B, 206C) in a front-and-rear direction in the same lane as the lane in which the vehicle is traveling and a distance threshold (LTH2, LTH3) in the front-and-rear direction, or performs offset control to offset the traveling position of the vehicle in the vehicle width direction in a third mode in which the offset amount is increased as compared to the second offset amount in the second mode, and the offset amount is suppressed as compared to the first offset amount in the first mode.

Arrangement 4. The traveling control apparatus (100) according to the above-described embodiment is characterized in that the control means (20, COM) controls one of acceleration and deceleration of the vehicle in accordance with a position of the other vehicle traveling side by side with the vehicle.

Arrangement 5. The traveling control apparatus (100) according to the above-described embodiment is characterized in that if the other vehicle traveling side by side is located on a front side of the vehicle, the control means (20, COM) controls to decelerate the vehicle, and if the other vehicle is located on a rear side of the vehicle, the control means (20, COM) controls to accelerate the vehicle.

Arrangement 6. The traveling control apparatus (100) according to the above-described embodiment is characterized in that if the other vehicle in the front-and-rear direction in the same lane as the lane in which the vehicle is traveling exists within a distance less than the distance threshold in the front-and-rear direction based on the peripheral vehicle information, the control means (20, COM) performs control with priority given to the offset control rather than the control to accelerate or decelerate the vehicle.

Arrangement 7. The traveling control apparatus (100) according to the above-described embodiment is characterized in that if the other vehicle (206B, 206C) in the front-and-rear direction in the same lane exists at a distance not less than the distance threshold in the front-and-rear direction, the control means (20, COM) performs control with priority given to the control to accelerate or decelerate the vehicle rather than the offset control.

According to the traveling control apparatuses of arrangements 3 to 7, if the other vehicle traveling side by side approaches to a distance not more than the second distance threshold on the lateral side, as a measure at the time of emergency, the vehicle is accelerated or decelerated, or offset control is performed, thereby avoiding interference with the other vehicle existing around the vehicle.

Arrangement 8. The traveling control apparatus (100) according to the above-described embodiment is characterized by further comprising detection means (for example, 7c) for detecting a speed of the vehicle, wherein if the speed is less than a speed threshold, and another vehicle as a tracking target is detected based on the peripheral vehicle information in the same lane as the lane in which in the vehicle is traveling, the control means (20, COM) sets the second mode and performs the offset control.

According to the traveling control apparatus of arrangement 8, it is possible to perform offset control according to following in congestion as a traveling scene.

Arrangement 9. The traveling control apparatus (100) according to the above-described embodiment is characterized ire that the control means (20, COM)

determines, based on the map information, the position information of the vehicle on the map information and information concerning a static target included in the peripheral vehicle information, a type of a road on which the vehicle is traveling, and sets one of the first mode and the second mode based on the type of the road and performs the offset control.

Arrangement 10. The traveling control apparatus (100) according to the above-described embodiment is characterized in that based on a result of the determination, if the vehicle is traveling on an automobile road, the control means sets the first mode and performs the offset control, and if the vehicle is traveling on a non-automobile road, the control means (20, COM) sets the second mode and performs the offset control.

According to the traveling control apparatuses of arrangements 9 and 10, it is possible to perform offset control according to the type of the road as a traveling scene.

Arrangement 11. The traveling control apparatus (100) according to the above-described embodiment is characterized in that the control means (20, COM) specifies, based on level information representing the set automated driving level, whether the currently set automated driving level is an automated driving level of high level in which a surroundings monitoring duty is not required of a driver or an automated driving level of low level in which the surroundings monitoring duty is required of the driver, and if the currently set automated driving level is the automated driving level of low level based on the level information, or a transition from the automated driving level of high level to the automated driving level of low level occurs, the control means (20, COM) sets the first mode and performs the offset control.

According to the traveling control apparatus of arrangement 11, if the automated driving level transitions, it is possible to perform offset control according to the transitioned automated driving level as a traveling scene.

Arrangement 12. The traveling control apparatus (100) according to the above-described embodiment is characterized in that if the traveling of the vehicle is changed from automated driving to manual driving, the control means (20, COM) ends the offset control.

Arrangement 13. The traveling control apparatus (100) according to the above-described embodiment is characterized in that if the traveling of the vehicle is changed from automated driving to manual driving, and a control state of the vehicle is an offset control state, the control means (20, COM) performs return control to return the vehicle traveling in an offset state to a center portion of a lane in which the vehicle traveled before the offset control.

Arrangement 14. The traveling control apparatus (100) according to the above-described embodiment is characterized in that in the return control, based on a calculation result of a steering assist torque needed to return the offset amount to an original offset amount, the control means (20, COM) controls to control a steering device to generate a driving force to automatically steer front wheels of the vehicle, decrease the steering assist torque as the vehicle returns to the lane center portion, and make the steering assist torque zero in a state in which the vehicle has returned to the lane center portion.

According to the traveling control apparatuses of arrangements 12 to 14, if the automated driving level transitions, it is possible to perform offset control according to a case in which automated driving is changed to manual driving as a traveling scene.

Arrangement 15. The traveling control apparatus (100) according to the above-described embodiment is characterized in that the control means (20, COM)

sets the first offset amount in the first mode, the second offset amount in the second mode, and the third offset amount in the third mode in accordance with a type of the other vehicle determined based on the peripheral vehicle information, and performs the offset control.

According to the traveling control apparatus of arrangement 15, it is possible to set the offset amount in accordance with the type of the other vehicle traveling side by side and perform the offset control.

Arrangement 16. The traveling control apparatus (100) according to the above-described embodiment is characterized that the control means (20, COM)

increments a first accumulated offset count at a distance not more than the first distance threshold (LTH1), and performs the offset control if the incremented first accumulated offset count is not more than a first offset threshold count and a second offset threshold count, which are set in the first mode and the second mode, respectively, and suppresses execution of the offset control if the first accumulated offset count exceeds the first offset threshold count and the second offset threshold count, which are set.

Arrangement 17. The traveling control apparatus (100) according to the above-described embodiment is characterized in that the control means (20, COM)

increments a second accumulated offset count at a distance not more than the second distance threshold (L2), and performs the offset control if the incremented second accumulated offset count is not more than a third offset threshold count set in the third mode, and suppresses execution of the offset control if the second accumulated offset count exceeds the set third offset threshold count.

According to the traveling control apparatuses of arrangements 16 and 17, if the accumulated offset count is equal to or less than the set offset count, offset control is performed. If the accumulated offset count exceeds the set offset count, execution of the offset control is suppressed. This makes it possible to control execution or suppression of offset control in accordance with the traveling scene of the vehicle.

Arrangement 18. The traveling control apparatus (100) according to the above-described embodiment is characterized in that the control means (20, COM)

sets the first offset threshold count, the second offset threshold count, and the third offset threshold count in accordance with a type of the other vehicle determined based on the peripheral vehicle information.

According to the traveling control apparatus of arrangement 18, the first offset threshold count, the second offset threshold count, and the third offset threshold count are set in accordance with the type of the other vehicle. This makes it possible to perform offset control in accordance with the traveling scene of the vehicle.

Arrangement 19. The traveling control apparatus (100) according to the above-described embodiment is characterized in that the control means (20, COM)

changes the first offset amount and the second offset amount to offset amounts obtained by decreasing the first offset amount and the second offset amount in accordance with an increase in the first accumulated offset count.

Arrangement 20. The traveling control apparatus (100) according to the above-described embodiment is characterized in that the control means (20, COM)

increments a second accumulated offset count at a distance not more than the second distance threshold, and if the incremented second accumulated offset count increases beyond a third offset threshold count set in the third mode, changes the third offset amount to an offset amount obtained by decreasing the third offset amount.

According to the traveling control apparatuses of arrangements 19 and 20, if the second accumulated offset count increases beyond the third offset threshold count, the offset amount is gradually decreased in accordance with an increase in the accumulated offset count, thereby suppressing offset control without giving a sense of incongruity to the driver and the like.

Arrangement 21. A vehicle according to the above-described embodiment is characterized by comprising a traveling control apparatus described in any one of arrangements 1 to 20.

According to the vehicle of arrangement 21, the traveling control apparatus provided in the vehicle enables traveling by controlling the offset amount to the other vehicle in accordance with the traveling scene of the vehicle.

Arrangement 22. A traveling control method according to the above-described embodiment is a traveling control method of a traveling control apparatus (for example, 100) configured to control automated driving traveling of a vehicle (for example, 1) based on a set automated driving level (for example, level 1-level 4), characterized by comprising:

an acquisition step of acquiring traveling scene information that specifies a traveling scene of the vehicle; and a control step of performing offset control to offset a traveling position of the vehicle in a vehicle width direction to increase a distance to another vehicle traveling side by side with the vehicle, wherein in the control step, as modes of the offset control, a first mode in which if the distance to the other vehicle becomes not more than a first distance threshold on a lateral side, the distance is increased by a first offset amount, and a second mode of a second offset amount whose offset amount is suppressed as compared to the first offset amount in the first mode are provided, and the offset control is performed by setting one of the first mode and the second mode based on at least one of the traveling scene information and the automated driving level.

According to the traveling control method of arrangement 22, it is possible to control the offset amount to the other vehicle in accordance with the traveling scene of the vehicle.

The present invention is not limited to the above-described embodiments, and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A traveling control apparatus configured to control automated driving traveling of a vehicle, comprising:

an acquisition unit configured to acquire peripheral vehicle information concerning a target located around the vehicle; and a control unit configured to perform offset control to offset a traveling position of the vehicle in a vehicle width direction to increase a distance to another vehicle traveling side by side with the vehicle, wherein the control unit has, as modes of the offset control, a first mode in which if the distance to the other vehicle becomes not more than a first distance threshold on a lateral side, the distance is increased by a first offset amount, and a second mode of a second offset amount whose offset amount is suppressed as compared to the first offset amount in the first mode, and performs the offset control by setting one of the first mode and the second mode, and wherein if the distance to the other vehicle becomes not more than a second distance threshold smaller than the first distance threshold on the lateral side, the control unit accelerates or decelerates the vehicle based on a comparison result between the distance to the other vehicle in a front-and-rear direction in the same lane as the lane in which the vehicle is traveling and a distance threshold in the front-and-rear direction, or performs offset control to offset the traveling position of the vehicle in the vehicle width direction in a third mode in which the offset amount is increased as compared to the second offset amount in the second mode, and the offset amount is suppressed as compared to the first offset amount in the first mode.

2. The traveling control apparatus according to claim 1, wherein the control unit controls one of acceleration and deceleration of the vehicle in accordance with a position of the other vehicle traveling side by side with the vehicle.

3. The traveling control apparatus according to claim 2, wherein if the other vehicle traveling side by side is located on a front side of the vehicle, the control unit controls to decelerate the vehicle, and if the other vehicle is located on a rear side of the vehicle, the control unit controls to accelerate the vehicle.

4. The traveling control apparatus according to claim 1, wherein if the other vehicle in the front-and-rear direction in the same lane as the lane in which the vehicle is traveling exists within a distance less than the distance threshold in the front-and-rear direction based on the peripheral vehicle information, the control unit performs control with priority given to the offset control rather than the control to accelerate or decelerate the vehicle.

5. The traveling control apparatus according to claim 1, wherein if the other vehicle in the front-and-rear direction in the same lane exists at a distance not less than the distance threshold in the front-and-rear direction, the control unit performs control with priority given to the control to accelerate or decelerate the vehicle rather than the offset control.

6. The traveling control apparatus according to claim 1, wherein
the acquisition unit acquires traveling scene information that specifies a traveling scene of the vehicle,
the control unit
determines, based on the traveling scene information, a type of a road on which the vehicle is traveling, and
sets one of the first mode and the second mode and the third mode based on the type of the road and performs the offset control.

7. The traveling control apparatus according to claim 6, wherein based on a result of the determination, if the vehicle is traveling on an automobile road, the control unit sets the first mode and performs the offset control, and if the vehicle is traveling on a non-automobile road, the control unit sets the second mode and performs the offset control.

8. The traveling control apparatus according to claim 6, wherein the traveling scene information includes at least one of map information, position information of the vehicle on the map information, and peripheral vehicle information concerning a target located around the vehicle.

9. The traveling control apparatus according to claim 1, wherein if the traveling of the vehicle is changed from automated driving to manual driving, the control unit ends the offset control.

10. The traveling control apparatus according to claim 9, wherein if the traveling of the vehicle is changed from automated driving to manual driving, and a control state of the vehicle is an offset control state, the control unit performs return control to return the vehicle traveling in an offset state to a center portion of a lane in which the vehicle traveled before the offset control.

11. The traveling control apparatus according to claim 10, wherein in the return control, based on a calculation result of a steering assist torque needed to return the offset amount to an original offset amount, the control unit controls to control a steering device to generate a driving force to automatically steer front wheels of the vehicle, decrease the steering assist torque as the vehicle returns to the lane center portion, and make the steering assist torque zero in a state in which the vehicle has returned to the lane center portion.

12. The traveling control apparatus according to claim 1, wherein
the control unit
sets the first offset amount in the first mode, the second offset amount in the second mode, and the third offset amount in the third mode in accordance with a type of the other vehicle determined based on the peripheral vehicle information, and performs the offset control.

13. The traveling control apparatus according to claim 1, wherein
the control unit
increments a first accumulated offset count at a distance not more than the first distance threshold, and performs the offset control if the incremented first accumulated offset count is not more than a first offset threshold count and a second offset threshold count, which are set in the first mode and the second mode, respectively, and
suppresses execution of the offset control if the first accumulated offset count exceeds the first offset threshold count and the second offset threshold count, which are set.

14. The traveling control apparatus according to claim 13, wherein
the control unit
increments a second accumulated offset count at a distance not more than the second distance threshold, and performs the offset control if the incremented second accumulated offset count is not more than a third offset threshold count set in the third mode, and
suppresses execution of the offset control if the second accumulated offset count exceeds the set third offset threshold count.

15. The traveling control apparatus according to claim 14, wherein
the control unit
sets the first offset threshold count, the second offset threshold count, and the third offset threshold count in accordance with a type of the other vehicle determined based on the peripheral vehicle information.

16. The traveling control apparatus according to claim 13, wherein
the control unit
changes the first offset amount and the second offset amount to offset amounts obtained by decreasing the first offset amount and the second offset amount in accordance with an increase in the first accumulated offset count.

17. The traveling control apparatus according to claim 13, wherein
the control unit
increments a second accumulated offset count at a distance not more than the second distance threshold, and if the incremented second accumulated offset count increases beyond a third offset threshold count set in the third mode, changes the third offset amount to an offset amount obtained by decreasing the third offset amount.

18. A vehicle comprising a traveling control apparatus described in claim 1.

19. A traveling control apparatus configured to control automated driving traveling of a vehicle, comprising:
a detection unit configured to detect a speed of the vehicle; and
a control unit configured to perform offset control to offset a traveling position of the vehicle in a vehicle width direction to increase a distance to another vehicle traveling side by side with the vehicle,
wherein the control unit
has, as modes of the offset control, a first mode in which if the distance to the other vehicle becomes not more than a first distance threshold on a lateral side, the distance is increased by a first offset amount, and a second mode of a second offset amount whose offset amount is suppressed as compared to the first offset amount in the first mode, and
performs the offset control by setting one of the first mode and the second mode, and
wherein if the speed is less than a speed threshold, and another vehicle as a tracking target is detected based on peripheral vehicle information in the same lane as the lane in which in the vehicle is traveling, the control unit sets the second mode and performs the offset control.

20. A traveling control apparatus configured to control automated driving traveling of a vehicle based on a set automated driving level, comprising:
an acquisition unit configured to acquire peripheral vehicle information concerning a target located around the vehicle; and
a control unit configured to perform offset control to offset a traveling position of the vehicle in a vehicle width direction to increase a distance to another vehicle traveling side by side with the vehicle,
wherein the control unit has, as modes of the offset control, a first mode in which if the distance to the other vehicle becomes not more than a first distance threshold on a lateral side, the distance is increased by a first offset amount, and a second mode of a second offset amount whose offset amount is suppressed as compared to the first offset amount in the first mode, and specifies, based on level information representing the set automated driving level, whether the currently set automated driving level is an automated driving level of high level in which a surroundings monitoring duty is not required of a driver or an automated driving level of low level in which the surroundings monitoring duty is required of the driver, and wherein if the currently set automated driving level is the automated driving level of low level based on the level information, or a transition from the automated driving level of high level to the automated driving level of low level occurs, the control unit sets the first mode and performs the offset control.

\* \* \* \* \*